US011637939B2

(12) United States Patent
Kim et al.

(10) Patent No.: US 11,637,939 B2
(45) Date of Patent: Apr. 25, 2023

(54) SERVER APPARATUS, USER TERMINAL APPARATUS, CONTROLLING METHOD THEREFOR, AND ELECTRONIC SYSTEM

(71) Applicant: SAMSUNG ELECTRONICS CO., LTD., Suwon-si (KR)

(72) Inventors: Hak-lae Kim, Daejeon (KR); Seung-hyun Lee, Iksan-si (KR); Jeong-soo Lee, Suwon-si (KR); Jung-yeon Yang, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 440 days.

(21) Appl. No.: 15/755,434

(22) PCT Filed: Jul. 25, 2016

(86) PCT No.: PCT/KR2016/008120
§ 371 (c)(1),
(2) Date: Feb. 26, 2018

(87) PCT Pub. No.: WO2017/039153
PCT Pub. Date: Mar. 9, 2017

(65) Prior Publication Data
US 2020/0236230 A1    Jul. 23, 2020

(30) Foreign Application Priority Data

Sep. 2, 2015  (KR) .................. 10-2015-0124282
Jan. 18, 2016  (KR) .................. 10-2016-0005887

(51) Int. Cl.
*H04N 1/00*       (2006.01)
*G06F 16/955*    (2019.01)
*H04L 67/303*    (2022.01)

(52) U.S. Cl.
CPC ....... *H04N 1/00244* (2013.01); *G06F 16/955* (2019.01); *H04L 67/303* (2013.01)

(58) Field of Classification Search
CPC .......... H04N 1/00206; H04N 1/00236; H04N 1/00204; H04N 1/00127; H04N 1/00244;
(Continued)

(56) References Cited

U.S. PATENT DOCUMENTS 7,117,355 B2    10/2006  Zomaya et al.
7,973,793 B2    7/2011   Yasugi et al.
(Continued)

FOREIGN PATENT DOCUMENTS

CN    101321257 A    12/2008
CN    104197901 A    12/2014
(Continued)

OTHER PUBLICATIONS

GoodRelations—The Web Vocabulary for E-Commerce, www.heppnetz.de/projects/goodrelations/, retrieved May 14, 2015, (1 page total).
(Continued)

*Primary Examiner* — Thomas J Dailey
(74) *Attorney, Agent, or Firm* — Sughrue Mion, PLLC

(57) ABSTRACT

Disclosed is a server apparatus. The server apparatus comprises: a communication unit for communicating with a user terminal apparatus; a storage for storing compatible information between devices; and a processor for, if the user terminal apparatus accesses the server apparatus and identification information on the user terminal apparatus is received from the user terminal apparatus, generating recommended device information compatible with the user terminal apparatus on the basis of the information stored in the storage and transmitting the recommended device information to the user terminal apparatus.

5 Claims, 30 Drawing Sheets

(58) Field of Classification Search
CPC .. G06F 16/955; G06F 16/9536; G06F 16/953; H04L 67/30; H04L 67/303
See application file for complete search history.

(56) References Cited

U.S. PATENT DOCUMENTS

| | | | |
|---|---|---|---|
| 8,788,944 | B1 | 7/2014 | Gill et al. |
| 9,449,342 | B2* | 9/2016 | Sacco ............... G06Q 30/0631 |
| 9,574,871 | B2* | 2/2017 | Choi .................... G01B 11/022 |
| 9,811,521 | B2* | 11/2017 | Sanio ...................... G06F 16/48 |
| 10,608,884 | B2* | 3/2020 | Oliver ................... G06F 9/5055 |
| 2002/0161664 | A1 | 10/2002 | Shaya et al. |
| 2005/0165712 | A1 | 7/2005 | Araki et al. |
| 2006/0190350 | A1* | 8/2006 | Maas ...................... G06Q 30/00 705/26.8 |
| 2008/0034081 | A1* | 2/2008 | Marshall |
| 2008/0101784 | A1* | 5/2008 | Hsu ......................... G03B 13/18 396/89 |
| 2008/0294693 | A1 | 11/2008 | Hayashi |
| 2011/0225640 | A1* | 9/2011 | Ganapathy |
| 2012/0040259 | A1* | 2/2012 | Tomura ............... H01M 8/0265 429/414 |
| 2012/0232897 | A1 | 9/2012 | Pettyjohn et al. |
| 2012/0284342 | A1* | 11/2012 | Jeong ...................... H04L 67/16 709/205 |
| 2013/0106910 | A1 | 5/2013 | Sacco |
| 2013/0117431 | A1 | 5/2013 | Oliver et al. |
| 2013/0166300 | A1 | 6/2013 | Yokoyama et al. |
| 2014/0025537 | A1* | 1/2014 | Venkataramu ..... G06Q 30/0621 705/26.61 |
| 2014/0032207 | A1 | 1/2014 | Jin et al. |
| 2014/0032359 | A1 | 1/2014 | Dewangan |
| 2014/0040259 | A1 | 2/2014 | Takematsu et al. |
| 2014/0222816 | A1 | 8/2014 | Chen et al. |
| 2014/0222861 | A1* | 8/2014 | Arling .................... G08C 23/04 707/769 |
| 2014/0285522 | A1* | 9/2014 | Kim .................. G06Q 30/0601 345/633 |
| 2014/0300722 | A1* | 10/2014 | Garcia .................. G06F 3/0482 348/77 |
| 2014/0315603 | A1 | 10/2014 | Fathollahi et al. |
| 2014/0372429 | A1 | 12/2014 | Ziklik et al. |
| 2015/0095329 | A1 | 4/2015 | Sanio et al. |
| 2015/0112838 | A1 | 4/2015 | Li et al. |
| 2016/0275949 | A1* | 9/2016 | Bishop .................... G10L 15/22 |

FOREIGN PATENT DOCUMENTS

| | | |
|---|---|---|
| CN | 104394045 A | 3/2015 |
| CN | 104506612 A | 4/2015 |
| EP | 3016083 A1 | 5/2016 |
| JP | 2002-245296 A | 8/2002 |
| JP | 2003-271389 A | 9/2003 |
| JP | 2012-53902 A | 3/2012 |
| JP | 2014-32501 A | 2/2014 |
| KR | 10-1992-0008669 A | 5/1992 |
| KR | 10-2014-0115232 A1 | 9/2014 |
| KR | 10-2014-0119305 A | 10/2014 |
| WO | 2013/032041 A1 | 3/2013 |
| WO | 2013/063299 A1 | 5/2013 |
| WO | 2015068991 A1 | 5/2015 |

OTHER PUBLICATIONS

ECl@ss, "Search Within the eCl@ss Standard", http://www.eclass.de/eclasscontent/standard/search.html.en, retrieved May 14, 2015, (1 page total).

GS1, "Welcome to GS1—The Global Language of Business", https://www.gs1.org/, retrieved May 14, 2015, (1 page total).

W3C Ubiquitous Web, "CC/PP Information Page", http://www.w3.org/Mobile/CCPP, retrieved May 14, 2015, (1 page total).

Best Buy, "Attention International Customers", https://www.bestbuys.com/, retrieved Sep. 3, 2015, (1 page total).

Amazon, "Amazon.com: Online Shopping", https://www.amazon.com/, retrieved Sep. 3, 2015, (1 page total).

Communication dated Oct. 31, 2016 by the International Searching Authority in counterpart International Patent Application No. PCT/KR/2016/008120. (PCT/ISA/210).

Communication dated Oct. 31, 2016 by the International Searching Authority in counterpart International Patent Application No. PCT/KR/2016/008120. (PCT/ISA/237).

PotatotreeSoft: "On 3D-CameraMeasure (Measure everything with your android camera!!)", (www.youtube.com/watch?v=jmoPCN2NM78), XP 054979507, Oct. 7, 2013, 2 pages.

Communication dated Feb. 26, 2020 from the European Patent Office in application No. 16842119.6.

Communication dated Apr. 24, 2018, from the European Patent Office in counterpart European Application No. 16842119.6.

Paul McFedries "Chapters 1, 3, 6" In: "iPhone ® Portable Genius" Oct. 20, 2014, (57 pages total) XP055467059.

"QR—What is a Quick Response barcode and how to create or read one", Prepressure, XP055545089, Aug. 27, 2015, 9 pages, Retrieved from URL: <URL:https://web.archive.org/web/20150827075042/https://www.prepressure.com/library/technology/qr-code>, Retrieved on Jan. 21, 2019.

Communication dated Jan. 28, 2019, issued by the European Patent Office in counterpart European Application No. 16842119.6.

Communication dated Jul. 16, 2020 issued by the Indian Patent Office in Indian counterpart Application Partial No. 201817011908.

Communication dated Jun. 25, 2021 issued by the European Patent Office in application No. 16842119.6.

Communication dated Jul. 5, 2021 issued by the State Intellectual Property Office of the P R.China in application No. 201680051214.9.

Communication dated Aug. 2, 2021 issued by the European Patent Office in application No. 16842119.6.

Communication dated Nov. 22, 2021 issued by the State Intellectual Property Office of the English P.R.China in application No. 201680051214.9.

Communication dated Feb. 21, 2022 issued by the Korean Intellectual Property Office in counterpart Korean Application No. 10-2016-0005887.

Communication dated Mar. 3, 2022 issued by the State Intellectual Property Office of P.R. China in counterpart Chinese application No. 201680051214.9.

Communication dated Dec. 5, 2022, issued by the Korean Intellectual Property Office in Korean English Patent Application No. 10-2022-0154672.

* cited by examiner

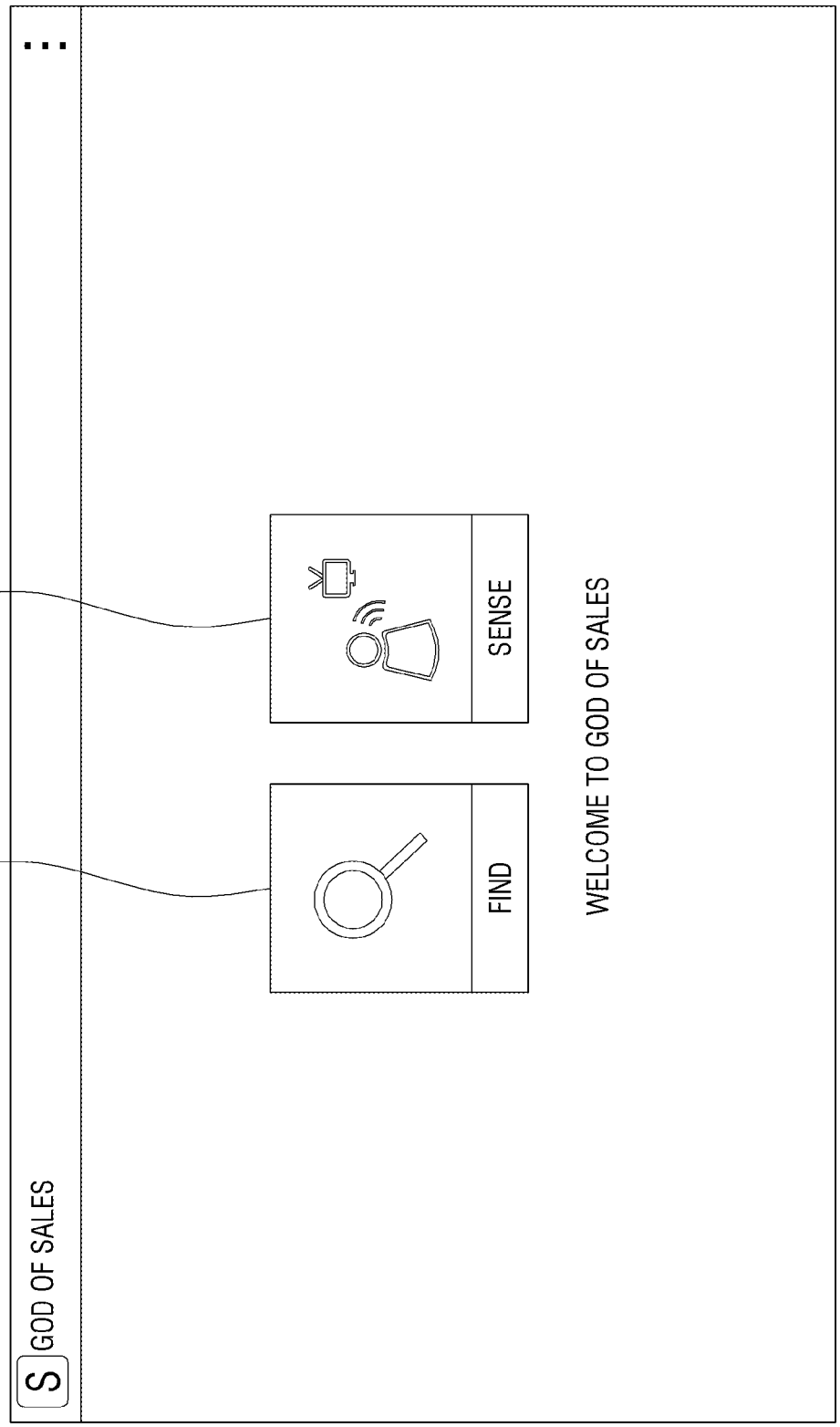

FIG. 12B

GOD OF SALES
OVERVIEW | SPECIFICATION | COMPATIBILITY | SPACE | COMPARISON | IMAGES | VIDEOS | REVIEWS | FAVORITE

Usage

Media Activity | Convenience | Exterior
Connectivity | | Smart Activity
Screen | Economy | Entertainment

1230

Features

- Content Sharing
- Easy to Configure
- Easy to Control
- Easy to Install
- Easy to Play Content
- Eye Comfort
- Fast Response
- Immersive Watching
- Multi Screen
- Recording Ready
- Screen Sharing Specification

| No. | SPEC/FUNCTION | APPLIED SENSOR | OPERATIONS |
|---|---|---|---|
| 1 | ION-STERILIZATION CLEANER | MAGNETIC DOOR SENSOR | OPEN DOOR |
| | TRIPLE INDEPENDENT COOLING | | |
| 2 | CHEF PANTRY | MAGNETIC DOOR SENSOR | OPEN PANTRY |
| 3 | CHEF FAN | MAGNETIC DOOR SENSOR | OPEN CHEF FAN |
| 4 | CHEF BASKET | TILT SENSOR | BASKET TILT |
| 5 | CHEF DRAWER | MAGNETIC DOOR SENSOR | OPEN DRAWER |
| 6 | DOUBLE-FOLD SHELVES | MAGNETIC DOOR SENSOR | CLOSE SHELVES |
| 7 | EASY-SLIDE SHELVES | MAGNETIC DOOR SENSOR | CLOSE SHELVES |
| 8 | TILT GUARD | TILT SENSOR | GUARD TILT |

SERVER APPARATUS, USER TERMINAL APPARATUS, CONTROLLING METHOD THEREFOR, AND ELECTRONIC SYSTEM

TECHNICAL FIELD

The present general inventive concept generally relates to a server apparatus, a user terminal apparatus, a method for controlling the same, and an electronic system, and more specifically, to a server apparatus which provides recommended device information, a user terminal apparatus, a method for controlling the same, and an electronic system.

BACKGROUND OF THE INVENTION

With the development of electronic technologies, various kinds of electronic apparatuses have been developed and distributed, and the electronic apparatuses having new user convenience functions are widely used. Further, the standards of the existing user convenience functions are continuously being changed and applied to the electronic apparatuses in order to enhance the user convenience.

The general public are unfamiliar with diverse functions of those new electronic apparatuses and experience difficulties in utilizing the functions. Further, it is difficult for the general public to understand the functions and operations of the electronic apparatuses based on only the specification information on the electronic apparatuses.

It is also difficult for an electronics store to display all of the various kinds of electronic apparatuses or provide a full explanation of the functions of the electronic apparatuses to the customers.

Accordingly, there is a need for a simpler method for providing a list of the electronic apparatuses which have functions that a user wants.

DETAILED DESCRIPTION OF THE INVENTION

Technical Purpose

The present disclosure has been provided to address the aforementioned and other problems and disadvantages occurring in the related art, and an aspect of the present disclosure provides a server apparatus which provides recommended device information on a device compatible with a certain apparatus, a user terminal apparatus, a method for controlling the same, and an electronic system.

Means for Solving Problems

According to an embodiment of the present disclosure, there is provided a server apparatus. The server apparatus includes a communication unit configured to communicate with a user terminal apparatus, a storage configured to store compatible information between devices, and a processor configured to, in response to the user terminal apparatus accessing the server apparatus and identification information on the user terminal apparatus being received from the user terminal apparatus, generate recommended device information on a device compatible with the user terminal apparatus based on information stored in the storage and transmit the generated recommended device information to the user terminal apparatus.

According to an embodiment of the present disclosure, there is provided a user terminal apparatus. The user terminal apparatus includes a display, a communication unit configured to communicate with a server apparatus, and a processor configured to, in response to the user terminal apparatus accessing the server apparatus, transmit identification information on the user terminal apparatus to the server apparatus, receive recommended device information on a device compatible with the user terminal apparatus from the server apparatus, and display the received recommended device information through the display.

According to an embodiment of the present disclosure, there is provided an electronic system. The electronic system includes a user terminal apparatus configured to access a server apparatus and transmit identification information on the user terminal apparatus to the server apparatus, a server apparatus configured to store compatible information between devices, in response to the user terminal apparatus accessing the server apparatus and the identification information on the user terminal apparatus being received from the user terminal apparatus, generate recommended device information on a device compatible with the user terminal apparatus, and transmit the generated recommended device information to the user terminal apparatus. The user terminal apparatus may receive the recommended device information on the device compatible with the user terminal apparatus from the server apparatus and display the received recommended device information.

According to an embodiment of the present disclosure, there is provided a method for controlling a server apparatus. The method includes receiving, in response a user terminal apparatus accessing the server apparatus, identification information on the user terminal apparatus from the user terminal apparatus, generating recommended device information on a device compatible with the user terminal apparatus based on compatible information between devices, and transmitting the generated recommended device information to the user terminal apparatus.

According to an embodiment of the present disclosure, there is provided a method for controlling a user terminal apparatus. The method includes transmitting, in response to the user terminal apparatus accessing a server apparatus, identification information on the user terminal apparatus to the server apparatus, receiving recommended device information on a device compatible with the user terminal apparatus from the server apparatus, and displaying the received recommended device information.

Effects of the Invention

According to the above-described various embodiments of the present disclosure, recommended device information on a device compatible with a user device may be generated, and the generated recommended device information may be provided to a user.

BRIEF DESCRIPTION OF DRAWINGS

FIGS. 12A to 12F are diagrams provided to describe an example of a UI provided by a user terminal apparatus;

FIGS. 18A and 18B are diagrams provided to describe an example of a sensor installed in a device;

DETAILED DESCRIPTION OF PREFERRED EMBODIMENT

Figure 1:
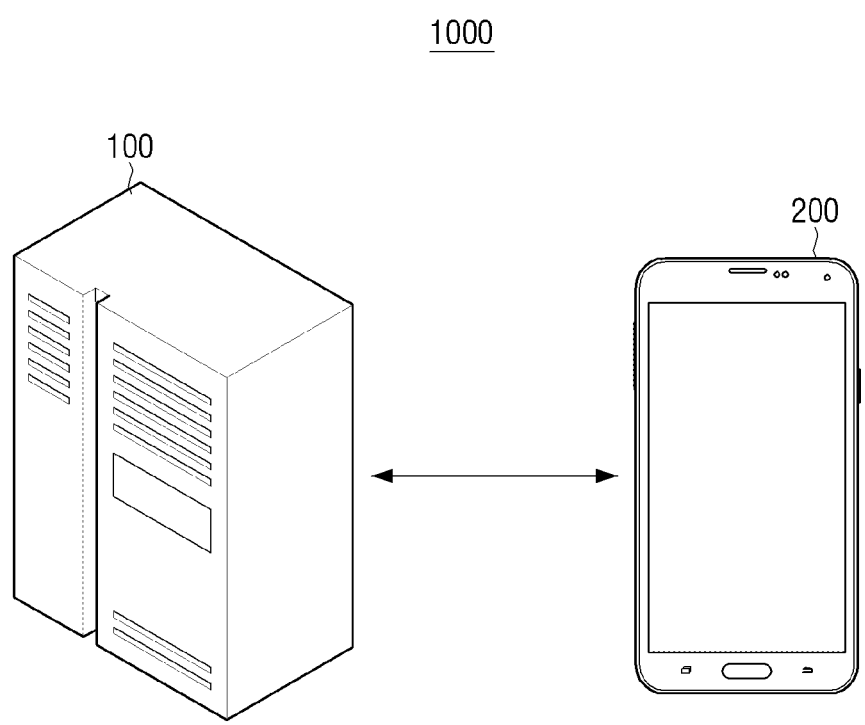
FIG. 1 is a diagram illustrating an electronic system according to an embodiment disclosed herein.

Certain embodiments are described below in greater detail with reference to the accompanying drawings. The embodiments of the present disclosure do not limit the scope of the invention of the present disclosure and should be understood to include various modifications, equivalents, and/or alternatives. In the following description, like drawing reference numerals may be used for the like elements.

In the following description, when it is described that one component (for example, the first component) is coupled or connected with another component (for example, the second component) operatively or communicatively, it should be understood that the respective components are connected directly or connected indirectly through still another component (for example, the third component). When it is described that one component (for example, the first component) is 'directly' coupled or connected with another component (for example, the second component), it should be understood that other component (for example, the third component) does not exist between the first and second components.

The terms in the present disclosure are used to describe an arbitrary embodiment and are not intended to limit the scope of other embodiments. A term in a singular form may be used for convenience in explanation, and it may be understood that the singular form includes a plural form unless it is intentionally written that way. The terms used in the present disclosure have the same meaning as what is commonly understood by a person having ordinary skill in the art to which the present disclosure pertains. The terms defined in a common dictionary may be interpreted to have the meaning which is the same as or similar to the contextual meaning in the related art. Unless obviously defined that way herein, the terms are not understood as an ideal or excessively formal meaning. In some cases, the terms cannot be interpreted to exclude the embodiments of the present disclosure even through they are defined herein.

Hereinafter, various embodiments of the present disclosure are provided in detail with reference to the accompanying drawings.

FIG. 1 is a diagram illustrating an electronic system 1000 according to an embodiment disclosed herein. As illustrated in FIG. 1, the electronic apparatus 1000 includes a server apparatus 100 and a user terminal apparatus 200.

The server apparatus 100 may communicate with the user terminal apparatus 200. The server apparatus 100 may receive identification information on the user terminal apparatus 200 from the user terminal apparatus 200. In this case, the identification information may include the information on the user terminal apparatus 200, such as, a product name, a product type, a serial number, a manufacturer, and user information.

The server apparatus 100 may be realized as a central server (or an integration server) which manages interaction between various operating systems and applications in all network systems or may be realized as a cloud server which uses a cloud computing method. The cloud computing may refer to an internet-based computing method, and more particularly, to a web-based software service which stores a program in a utility data server on the internet and invokes the program in a computer or a mobile phone when necessary.

The server apparatus 100 may receive identification information on other devices from the user terminal apparatus 200 in addition to the identification information on the user terminal apparatus 200. By way of example, the server apparatus 100 may receive the identification information on a user's smart phone as the identification information on the user terminal apparatus 200 and may further receive identification information on a user's notebook computer or MP3 player.

Further, the server apparatus 100 may receive authentication information for accessing a user account from the user terminal apparatus 200. In this case, the authentication information may include an ID and a password of the user account. In some cases, the authentication information may include fingerprint information or iris information on the user.

The server apparatus 100 may store compatible information between devices. For example, the server apparatus 100 may store information on a device which is capable of performing data communications with respect to the user terminal apparatus 200.

The compatible information between devices may include at least one of hardware-wise compatible information and software-wise compatible information. As an example, the server apparatus 100 may store information on a device which uses connection socket standards the same as the standards of the user terminal apparatus 200 as the hardware-wise compatible information. Further, the server apparatus 100 may store information on a device which supports the same application as the user terminal apparatus 200 as the software-wise compatible information.

The server apparatus 100 may generate recommended device information on a device which is compatible with the user terminal apparatus 200 and transmit the generated recommended device information to the user terminal apparatus 200. By way of example, the server apparatus 100 may generate the information including a notebook computer of the same manufacturer as the recommended device compatible with the user terminal apparatus 200 and transmit the generated information to the user terminal apparatus 200.

The user terminal apparatus 200 may communicate with the server apparatus 100. The user terminal apparatus 200 may transmit the identification information on the user terminal apparatus 200 to the server apparatus 100. Further, the user terminal apparatus 200 may transmit the identification information on another device which is not the user terminal apparatus 200 to the server apparatus 200 or transmit the authentication information for accessing the user account.

The user terminal apparatus 200 may receive device information from the server apparatus 100 and display the received device information. In this case, the device information may include the information on a device, such as, a product name, a serial number, or a manufacturer of the device, and may also include information as to how the device is compatible with the device having the identification information transmitted from the user terminal apparatus 200.

For example, when the user terminal apparatus 200 transmitted the identification information on monitor A to the server apparatus 100, the device information may include a graphic card which is connectable with the monitor A through DVI standards, a recording medium which is connectable with the monitor A through Universal Serial Bus (USB) standards, or a smart phone which is connectable with the monitor A through a High Definition Multimedia Interface (HDMI).

Figure 2A:
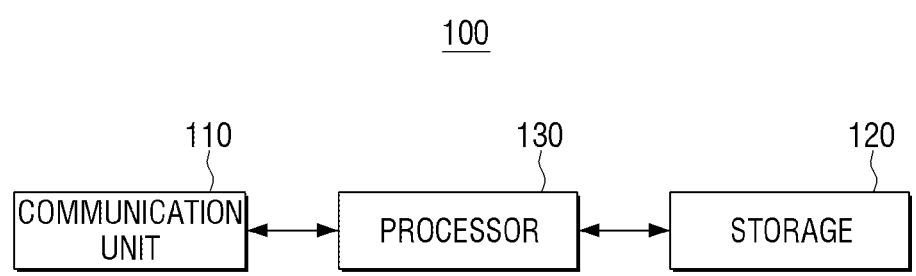
FIG. 2A is a block diagram illustrating a structure of a server apparatus according to an embodiment disclosed herein.

FIG. 2A is a block diagram illustrating a structure of a server apparatus 100 according to an embodiment disclosed herein.

As illustrated in FIG. 2A, the server apparatus 100 includes a communication unit 110, a storage 120, and a processor 130.

The communication unit 110 may communicate with a user terminal apparatus 200. To be specific, the communication unit 110 may receive the identification information on a device from the user terminal apparatus 200 and transmit the recommended device information to the user terminal apparatus 200.

The communication unit 110 may receive the authentication information for accessing the user account from the user terminal apparatus 200 an transmit the recommended device information on a device is compatible with a device registered at the user account to the user terminal apparatus 200.

Further, the communication unit 110 may communicate with the user terminal apparatus 200 by using a wired/wireless Local Area Network (LAN), a Wide Area Network (WAN), Ethernet, Bluetooth, Zigbee, IEEE 1394, Wireless-Fidelity (Wi-Fi), Power Line Communication (PLC), or the like.

The storage 120 may store the specification information on a plurality of devices. The storage 120 may store at least one of function information, appearance information, a device name, a manufacturer name, size information, and device type information as the specification information. For example, the storage 120 may store the information, such as, an HDMI support function, 42-inch, an Organic Light-Emitting Diodes (OLED) TV, and manufacturer A, as the specification information on a TV. Further, the storage 120 may further store information on other devices, such as, a notebook computer, a washing machine, or a cleaner, on top of the information on the TV.

The storage 120 may store the compatible information between devices based on the stored specification information. This operation was described above, and a detailed description is omitted.

The storage 120 may store a user language system where the representative functions of a device are expressed as diverse forms, such as, a noun, a verb, or a phrase. Further, the storage 120 may store a database including a list and the specification information on devices and a database for linking the user language system with the specification information.

The processor 130 controls overall operations of the server apparatus 100. The processor 130 may include one or more of a Central Processing Unit (CPU), a controller, an Application Processor (AP), a communication processor (CP), and an ARM processor.

In response to the user terminal apparatus 200 accessing the server apparatus 100 and the identification information on the user terminal apparatus 200 being received from the user terminal apparatus 200, the processor 130 may generate the recommended device information on a device compatible with the user terminal apparatus 200 based on the information stored in the storage 120 and transmit the generated recommended device information to the user terminal apparatus 200.

In this case, the user terminal apparatus 200 may be directly connected to the server apparatus 100 through Bluetooth or may be indirectly connected to the server apparatus 100 through the internet network. In response to the communications being connected to the user terminal apparatus 200, the processor 130 may determine that the user terminal apparatus 200 accessed the server apparatus 100. In response to the authentication information on the user account being received from the user terminal apparatus 200 and the user account being accessible by the received authentication information, the processor 130 may determine that the user terminal apparatus 200 accessed the server apparatus 100. In the above example, the server apparatus 100 stores the user account, but not limited thereto. By way of example, an external server apparatus which stores a user account may be provided separately from the server apparatus 100. In this case, the server apparatus 100 may transmit the received authentication information to the external server apparatus to access the user account.

In response to the user terminal apparatus 200 accessing the server apparatus 100, the processor 130 may receive the identification information on the user terminal apparatus 200 from the user terminal apparatus 200. The identification information on the user terminal apparatus 200 may include the information on the user terminal apparatus 200, such as, a product name, a product type, a serial number, a manufacturer, and user information. As an example, the server apparatus 100 may receive the serial number of the user terminal apparatus 200 from the user terminal apparatus 200 and determine the product type or the specification information of the user terminal apparatus 200, but not limited thereto. The server apparatus 100 may receive the entire specification information on the user terminal apparatus 200 as well as the identification information on the user terminal apparatus 200.

In response to the authentication information being received from the user terminal apparatus 200, the processor 130 may generate the recommended device information on a device compatible with the device registered at the user account. In this case, the user account may include the device information which was pre-registered by the user.

The server apparatus 100 may generate the recommended device information on the device compatible with the user terminal apparatus 200 based on the information stored in the storage 120. For example, the server apparatus 100 may identify the user terminal apparatus 200 based on the received identification information and extract the specification information on the user terminal apparatus 200. Subsequently, the server apparatus 100 may generate the recommended device information on the device compatible with the user terminal apparatus 200 based on the extracted specification information.

The server apparatus 100 may receive specific information of the specification information on the user terminal apparatus 200 from the user terminal apparatus 200. By way of example, the server apparatus 100 may further receive information on the display from the user terminal apparatus 200. In this case, the processor 130 may generate the recommended device information on the compatible device based on a connection method of the display of the user terminal apparatus 200.

In response to the specific information not being received, the processor 130 may extract the recommended device information on all of the compatible devices based on the specification information on the user terminal apparatus 200 and arrange the extracted recommended device information according to predetermined criteria. For example, the processor 130 may extract a first recommended device list based on the connection method of the display and extract a second recommended device list based on the connection method of the communications. The processor 130 may arrange the first and second recommended device lists according to the predetermined criteria and generate the recommended device information.

The processor 130 may transmit the generated recommended device information to the user terminal apparatus 200.

In response to a user uttered voice signal inputted through the user terminal apparatus 200 being received from the user terminal apparatus 200, the processor 130 may decide the device information on a device associated with at least one text included in the uttered voice signal as the recommended device information. In this case, the user terminal apparatus 200 may include a microphone.

The uttered voice signal may be a signal where a user voice inputted in the user terminal apparatus 200 was digitized, but not limited thereto. The server apparatus 100 may receive the text extracted from the user uttered voice from the user terminal apparatus 200.

The processor 130 may extract at least one text included in the uttered voice signal and decide the device information on a device associated with the extracted text as the recommended device information. For example, in response to receiving the uttered voice signal "Find a monitor wirelessly connectable with my smart phone," the processor 130 extract the texts 'smart phone,' 'wirelessly connect,' and 'monitor,' extract a wireless communications function of the user's smart phone, extract a monitor that supports the extracted wireless communications function, and generate the recommended device information.

In the above example, the processor 130 receives the uttered voice signal, but not limited thereto. For example, the processor 130 may receive text input information inputted through the user terminal apparatus 200 from the user terminal apparatus 200. The processor 130 may decide the device information on a device associated with the received text information as the recommended device information.

Particularly, the processor 130 may detect the specification information associated with at least one text included in the uttered voice signal from the storage 120 and decide the information on the device having the detected specification information as the recommended device information. In this case, the specification information may include at least one of the function information, the appearance information, the device name, the manufacturer name, the size information, and the device type information.

In response to the uttered voice signal including names of a plurality of different types of devices, the processor 130 may detect the specification information on an interworking function between the plurality of different types of devices from the storage 120 and decide the information on a device which provides the interworking function as the recommended device information.

In response to the specification information associated with the uttered voice signal not being extracted, the processor 130 may transmit a signal for requesting for input of an additional uttered voice to the user terminal apparatus 200. In this case, the user terminal apparatus 200 may receive the signal for requesting for the input of the additional uttered voice and display a query for inducing the input of the additional uttered voice.

In response to the user uttered voice signals gradationally inputted being received from the user terminal apparatus 200, the processor 130 may decide the device information on a device associated with at least one text included in the respective user uttered voice signals inputted gradationally as the recommended device information.

Further, the processor 130 may transmit information on the number of functions supported by the respective devices corresponding to the extracted specification information to the user terminal apparatus 200.

In response to a plurality of user uttered voice signals being received from the user terminal apparatus 200, the processor 130 may decide the recommended device information on a device having the specification information corresponding to the respective user uttered voices as the recommended device information. Particularly, the processor 130 may transmit the recommended device information on the devices corresponding to the plurality of respective user uttered voice signals to the user terminal apparatus 200.

In response to an image of a specific space photographed through the user terminal apparatus 200 being received from the user terminal apparatus 200, the processor 130 may calculate a size of the specific space based on the received image and decide the device information on a device corresponding to the calculated size of the specific space as the recommended device information.

Particularly, in response to an identification image included in the received image being detected, the processor 130 may calculate the size of the specific space based on pre-stored information on a size and a shape of the identification image.

The processor 130 may decide the device information on the device compatible with the user terminal apparatus 200 and the user device registered at the user account of the user terminal apparatus 200 as the recommended device information based on the information on the registered user device.

Figure 2B:
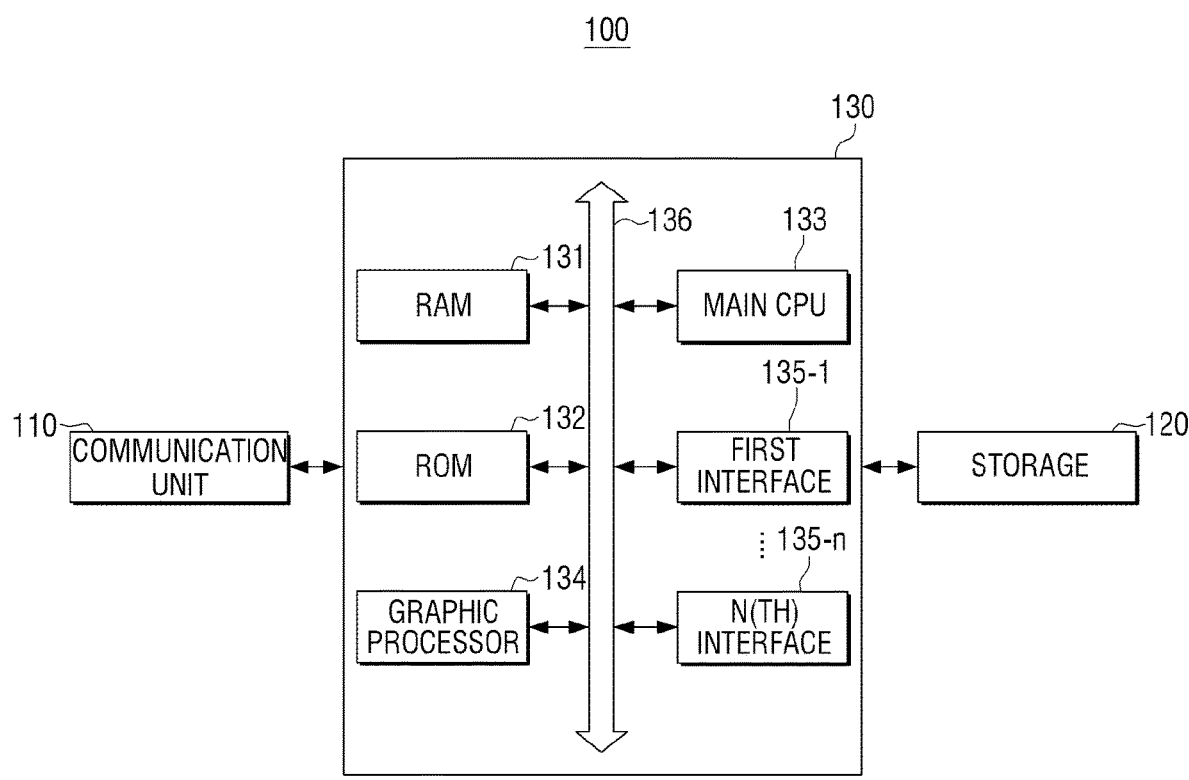
FIG. 2B is a block diagram illustrating a detailed structure of the server apparatus of FIG. 2A.

FIG. 2B is a block diagram illustrating a detailed structure of the server apparatus 100 of FIG. 2A. Some of the components of the server apparatus 100 of FIG. 2A are the same as the components of FIG. 2A, and a repeated description on the components is omitted.

The processor 130 includes a Random Access Memory (RAM) 131, a Read-Only Memory (ROM) 132, a main Central Processing Unit (CPU) 133, a graphic processor 134, first to n(th) interfaces 135-1 to 135-n, and a bus 136.

The RAM 131, the ROM 132, the main CPU 133, the graphic processor 134, and the first to n(th) interfaces 135-1 to 135-n may be interconnected through the bus 136.

The first to n(th) interfaces 135-1 to 135-n may be connected to the aforementioned various components. One of the interfaces 135-1 to 135-n may be realized as a network interface connected to an external apparatus through a network.

The main CPU 133 may access the storage 120 and perform the boot-up operation by using an Operating System (O/S) in the storage 120. Further, the main CPU 133 may perform various operations by using diverse programs, content, and data stored in the storage 120.

The ROM 132 may store a command set for system booting. In response to power being supplied by a turn-on command, the main CPU 133 may copy the O/S in the storage 120 to the RAM 131 according to the commands stored in the ROM 132 and boot up a system by executing the O/S. Upon completion of the booting operation, the main CPU 133 may copy various programs in the storage 120 to the RAM 131 and execute the programs copied to the RAM 131 to perform various operations.

The graphic processor 134 may generate a screen including various objects, such as, icons, images, or text, by using a computing unit (not shown) and a rendering unit (not shown). The computing unit may compute attribute values of the objects, such as, coordinate values, shapes, sizes, and colors, according to a layout of the screen based on the received control command. The rendering unit may generate a screen including the objects in various layouts based on the attribute values computed by the computing unit. For example, the graphic processor 134 may generate a UI screen for providing diverse guide information on environmental conditions. The above-described operations of the processor 130 may be performed by the programs in the storage 120.

As described above, the storage 120 may store diverse data, such as, an Operating System (O/S) software module for operating the server apparatus 100, a device information module, a space information calculating module, and so on.

Figure 3:
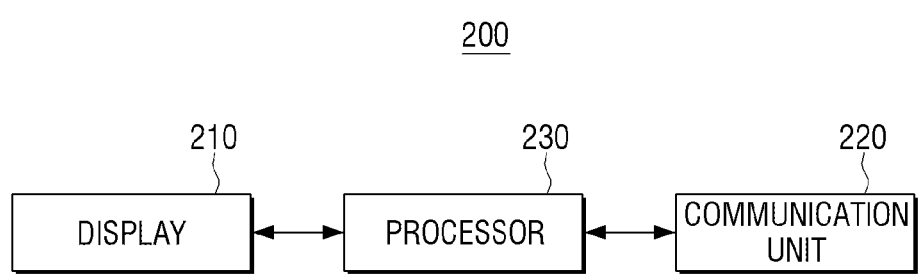
FIG. 3 is a block diagram illustrating a structure of a user terminal apparatus according to an embodiment disclosed herein.

FIG. 3 is a block diagram illustrating a structure of a user terminal apparatus 200 according to an embodiment disclosed herein.

Referring to FIG. 3, the user terminal apparatus 200 includes a display 210, a communication unit 220, and a processor 230.

The display 210 may display the compatible device information received from the server apparatus 100 by the control of the processor 230. For example, the display 210 may display a device list of the devices compatible with the user terminal apparatus 200.

The display 210 may be realized as a Liquid Crystal Display Panel (LCD) or Organic Light Emitting Diodes (OLED), but not limited thereto. The display 210 may be also realized as a flexible display or a transparent display in some cases.

The communication unit 220 may communicate with the server apparatus 100. To be specific, the communication unit 220 may transmit the identification information on a device to the server apparatus 100 and receive the recommended device information from the server apparatus 100.

The communication unit 220 may transmit the authentication information for accessing the user account to the server apparatus 100 and receive the recommended device information on the device compatible with the device registered at the user account from the server apparatus 100.

The communication unit 220 may communicate with the server apparatus 100 by using a wired/wireless Local Area Network (LAN), a Wide Area Network (WAN), Ethernet, Bluetooth, Zigbee, IEEE 1394, Wireless-Fidelity (Wi-Fi), Power Line Communication (PLC), or the like.

The processor 230 controls overall operations of the user terminal apparatus 200. The processor 230 may include one or more of a Central Processing Unit (CPU), a controller, an Application Processor (AP), a communication processor (CP), and an ARM processor.

In response to the user terminal apparatus 200 accessing the server apparatus 100, the processor 230 may transmit the identification information on the user terminal apparatus 200 to the server apparatus 100, receive the recommended device information on the device compatible with the user terminal apparatus 200 from the server apparatus 100, and display the received recommended device information through the display 110.

In this case, the user terminal apparatus 200 may further include an input unit for receiving the user uttered voice, for example, a microphone. The processor 230 may display the device information on the device associated with at least one text included in the user uttered voice, out of the recommended device information.

The user terminal apparatus 200 may further include a camera. The processor 230 may display the device information on the device corresponding to the size of the specific space photographed by the camera, out of the recommended device information.

In this case, the processor 230 may photograph an image by using the camera. In response to the identification image included in the photographed image being sensed, the processor 230 may calculate the size of the specific space based on the pre-stored information on the size and the shape of the identification image.

The processor 230 may transmit the authentication information for accessing the user account of the user terminal apparatus 200 to the server apparatus 100. Subsequently, the processor 230 may receive the recommended device information on the device compatible with the user terminal apparatus 200 and the user device registered at the authenticated user account from the server apparatus 100 and display the received the recommended device information.

In response to the number of the recommended devices exceeding a predetermined number while the recommended device information is displayed, the processor 230 may display a query for inducing an additional user uttered voice. For example, the processor 230 may display the query for inducing the additional user uttered voice when the recommended device information are unable to be displayed at once in the display 210.

The processor 230 may display a query for gradationally inducing the user uttered voices. In response to the user uttered voices with respect to the query being received, the processor 230 may transmit the user uttered voices inputted gradationally to the server apparatus 100, receive the recommended device information on the device corresponding to the user uttered voices, and display the recommended device information.

Further, the processor 230 may display the query for gradationally inducing the user uttered voices, transmit the entire uttered voices inputted gradationally to the server apparatus 100, receive the recommended device information on the device corresponding to the entire uttered voices, and display the recommended device information.

In this case, in response to a user input of selecting any one of the devices being received while the recommended device information is displayed, the processor 230 may display the specification information on the devices corresponding to the user uttered voices inputted gradationally as a graph.

In response to the user input of selecting any one of the devices being received while the recommended device information is displayed, the processor 230 may further display detailed information on the selected device. By way of example, the processor 230 may display the specification information on the selected device or display the compatible information between the selected device and the user terminal apparatus 200.

Further, the processor 230 may receive the information on the number of the functions supported by the respective recommended devices corresponding to the extracted specification information from the server apparatus 100 and display the recommended device information based on the received information. As an example, the processor 230 may display a device which supports more functions to be visually noticeable.

In response to receiving a plurality of user uttered voices, the processor 230 may transmit the inputted user uttered voices to the server apparatus 100, receive the recommended device information on the devices having the specification information corresponding to the respective user uttered voices, and display the received recommended device information together with the user uttered voices.

In this case, in response to receiving a user instruction of deactivating any one of the plurality of user uttered voices, the processor 230 may remove a device having the specification information corresponding to the deactivated user uttered voice and display the recommended device information.

Figure 4:
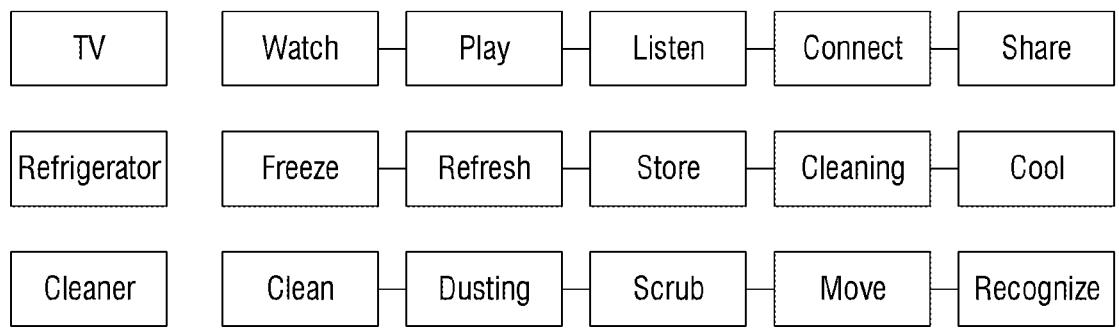
FIG. 4 is a diagram provided to describe representative functions of each device according to an embodiment disclosed herein.

FIG. 4 is a diagram provided to describe representative functions of each device according to an embodiment disclosed herein.

Referring to FIG. 4, the storage 120 of the server apparatus 100 may store the functions provided by the respective devices. For example, the storage 120 may store the functions provided by a TV, such as, watching broadcasting (Watch), playing content (Play), and sharing content (Share). The storage 120 may also store the functions provided by a refrigerator, such as, freezing food (Freeze) and storing food (Store). Further, the storage 120 may store the functions provided by a cleaner, such as, cleaning (Clean), removing dust (dusting), and moving (Move).

FIG. 4 illustrates three types of devices, but not limited thereto. The storage 120 may store the information on more types of devices.

The storage 120 may set sub categories of the respective devices and store the information on the functions provided by the respective devices. For example, the storage 120 set the sub categories for each manufacturer of a TV and store the information on the provided functions.

Further, the storage 120 may set lower sub categories of the sub categories and store the information. For example, the storage 120 may store the information on the functions provided by a TV based on a panel type of the TV products of manufacturer A.

The storage 120 may store the compatible information between the devices. By way of example, the storage 120 may store the compatible information between the same type of devices or may store the compatible information between different types of devices.

In response to the user terminal apparatus 200 accessing the server apparatus 100 and the identification information on the user terminal apparatus 200 being received from the user terminal apparatus 200, the processor 130 may generate the recommended device information on the device compatible with the user terminal apparatus 200 based on the information stored in storage 120 and transmit the generated recommended device information to the user terminal apparatus 200.

Particularly, in response to the user uttered voice signal inputted through the user terminal apparatus 200 being received from the user terminal apparatus 200, the processor 130 may decide the device information on the device associated with at least one text included in the uttered voice signal as the recommended device information.

For example, in response to receiving the uttered voice signal "It would be good if the video is played" from the user terminal apparatus 200, the processor 130 may decide the device information on a TV having a content playback function as the recommended device information.

That is, even though the uttered voice signal including common everyday language is received, the processor 130 may extract the function provided by the device and decide the device information on the device which provides the extracted function as the recommended device information.

The storage 120 may store the device information on a smart phone, a notebook computer, and a desktop Personal Computer (PC) along with the provided functions thereof. Accordingly, in response to receiving the uttered voice signal "It would be good if the video is played" from the user terminal apparatus 200, the processor 130 may decide the device information on the smart phone and the notebook computer as the recommended device information in addition to the TV.

Particularly, the processor 130 may decide the device information on the device in the sub category corresponding to the uttered voice signal as the recommended device information. For example, the processor 130 may decide the device information on a TV of manufacturer A which has the serial number 'xxx-xxxxxxx' and corresponds to the uttered voice signal as the recommended device information.

The processor 130 may include the device list of the recommended devices and the information on the functions provided by the recommended devices in the recommended device information and transmit the recommended device information to the user terminal apparatus 200. As an example, the processor 130 may transmit the entire specification information on the recommended devices to the user terminal apparatus 200.

Figure 5:
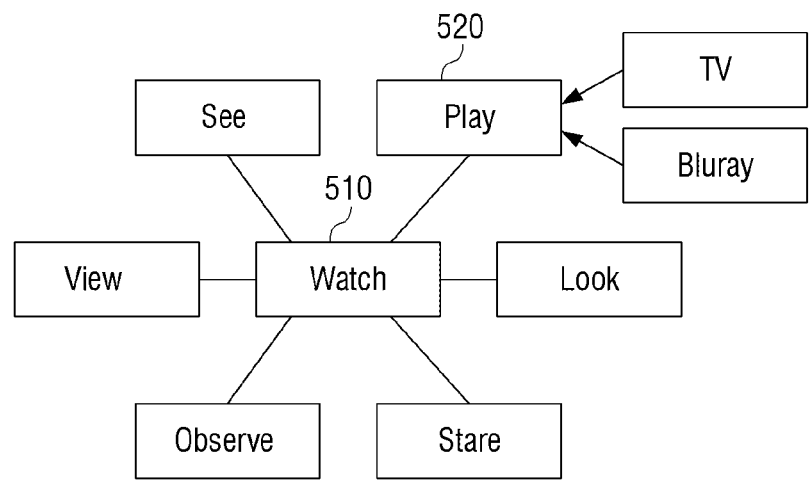
FIG. 5 is a diagram provided to describe a method for processing an uttered voice signal according to an embodiment disclosed herein.

FIG. 5 is a diagram provided to describe a method for processing an uttered voice signal according to an embodiment disclosed herein.

Referring to FIG. 5, in response to receiving the uttered voice signal, such as, See, Play, View, Observe, Stare, and Look, the processor 130 may determine that the uttered voice signal refers to a function 'Watch' 510. That is, the processor 130 may extract language inputs in the similar meanings as an input of one word. This extraction operation may be performed based on the information stored in the storage 120.

For example, in response to receiving the uttered voice signal, such as, 'it would be good if I watch . . . ,' 'I want to watch . . . ,' and 'let me watch,' the processor 130 may extract a word 'watch.' Further, the processor 130 may display the names of the devices which provide the 'watch' function, for example, a TV or a smart phone, based on the information stored in the storage 120. In order to execute this operation, the storage 120 may store a database where various languages in the similar meanings are grouped by technical terms or specification terms. The database might have been stored in the server apparatus 100 when the product is launched or may be downloaded from an external device at a later time. The database may be updated periodically or frequently.

The processor 130 may derive a new word by extracting a plurality of words from the uttered voice signal. To be specific, the processor 130 may derive a new word by extracting the function and the device type from the uttered voice signal. By way of example, the processor 130 may extract Play' 520 and 'TV' from the uttered voice signal and derive 'Watch' 510. In the same manner as described above, this extraction operation of the processor 130 may be performed based on the information stored in the storage 120.

Figure 6:
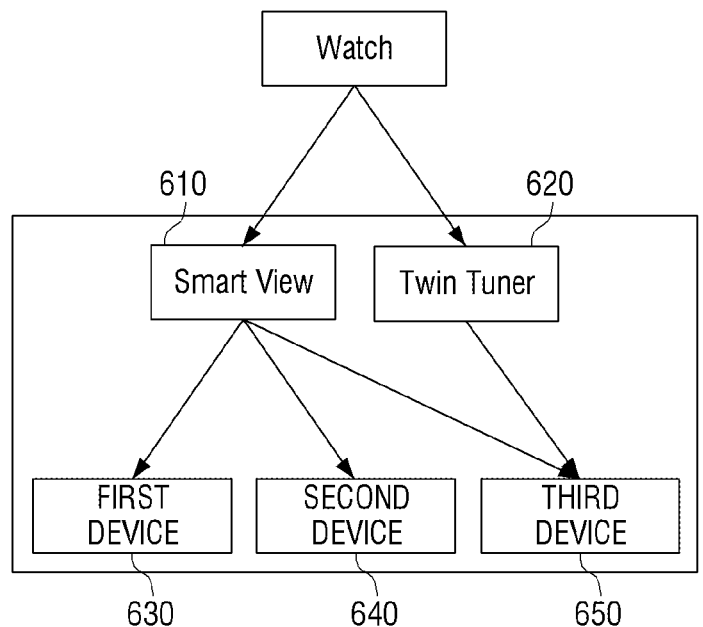
FIG. 6 is a diagram provided to describe a process of selecting a device according to an embodiment disclosed herein.

FIG. 6 is a diagram provided to describe a process of selecting a device according to an embodiment disclosed herein.

Referring to FIG. 6, the processor 130 may detect the specification information on the device associated with at least one text included in the uttered voice signal from the storage 120 and decide the device having the detected specification information as the recommended device.

As an example, the processor 130 may derive 'Watch' from the uttered voice signal and extract a device which provides a function 'Smart View' 610 and a function 'Twin Tuner' 620 as the functions corresponding to 'Watch.'

The processor 130 may extract a first device 630, a second device 640, and a third device 650 which support the function 'Smart View' 610 and extract the third device 650 which supports the function 'Twin Tuner' 620. By way of example, the processor 130 may distinguish and extract the devices which support the respective functions. According to the above example, the processor 130 may extract the first device 630, the second device 640, and the third device 650 as the devices which support the function 'Smart View' 610 and extract the third device 650 as the device which supports the function 'Twin Tuner' 620, but not limited thereto. The processor 130 may extract only the third device 650 which supports both of the functions.

In FIG. 6, only the functions 'Smart View' 620 and 'Twin Tuner' 620 were described as the functions corresponding to 'Watch,' but not limited thereto. For example, all of the devices having a display may be extracted based on its own meaning of 'Watch.' On top of the functions 'Smart View' 620 and 'Twin Tuner' 620, an HDMI support function may be also included as the functions corresponding to 'Watch.'

Figure 7:
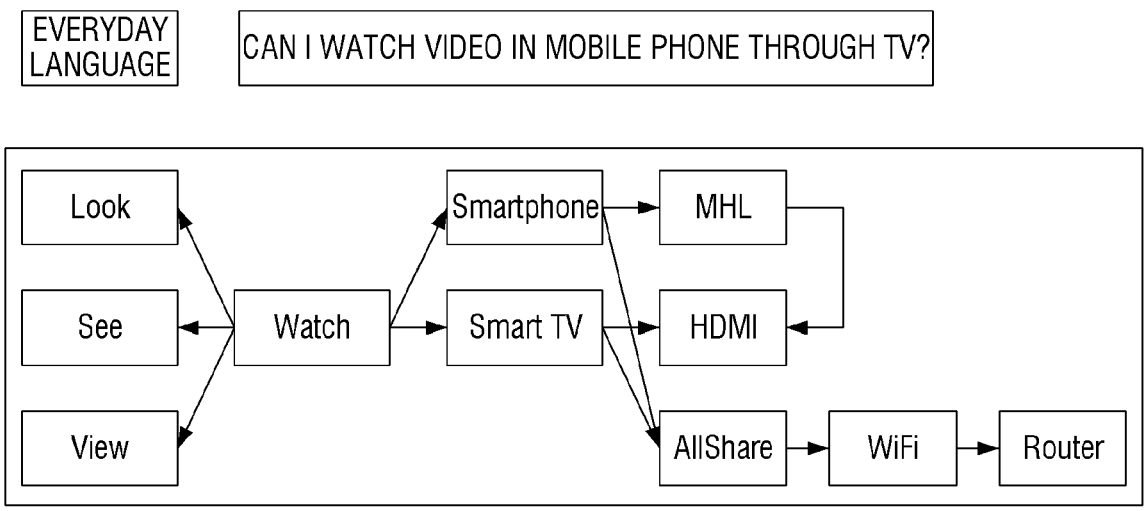
FIG. 7 is a diagram provided to describe a method for linking a function expressed by an uttered voice with specification information according to an embodiment disclosed herein.

FIG. 7 is a diagram provided to describe a method for linking a function expressed by an uttered voice with specification information according to an embodiment disclosed herein.

Referring to FIG. 7, in response to the uttered voice signal including the names of a plurality of different types of devices, the processor 130 may detect the specification information on the interworking function between the different types of devices from the storage 120.

For example, in response to receiving the uttered voice signal "Can I watch a video in a mobile phone through a TV?," the processor 130 may further extract 'mobile phone' and 'TV' in addition to 'Watch.' Subsequently, the processor 130 may detect the specification information on the interworking function between the mobile phone and the TV in connection with 'Watch,' That is, the processor 130 may detect an MHL support function and the HDMI support function for linking a display function of the mobile phone and the TV, but not limited thereto. The processor 130 may detect an AllShare support function using the Wi-Fi.

Further, the processor 130 may transmit the compatible information between the devices providing the interworking function to the user terminal apparatus 200. For example, the processor 130 may decide the names of the mobile phone having the MHL support function and the TV having the HDMI support function as the recommended device information and transmit the recommended device information to the user terminal apparatus 200. Further, the processor 130 may decide the device list of the mobile phone and the TV having the AllShare support function as the recommended device information and transmit the recommended device information to the user terminal apparatus 200.

In response to the user terminal apparatus 200 accessing the server apparatus 100, the processor 230 of the user terminal apparatus 200 may transmit the identification information on the user terminal apparatus 200 to the server apparatus 100, receive the recommended device information on the device compatible with the user terminal apparatus 200 from the server apparatus 100, and display the received recommended device information through the display 210.

Particularly, the user terminal apparatus 200 may further include an input unit for receiving the user uttered voice. The processor 230 may display the device information on the device associated with at least one text included in the user uttered voice out of the recommended device information.

Figure 8:
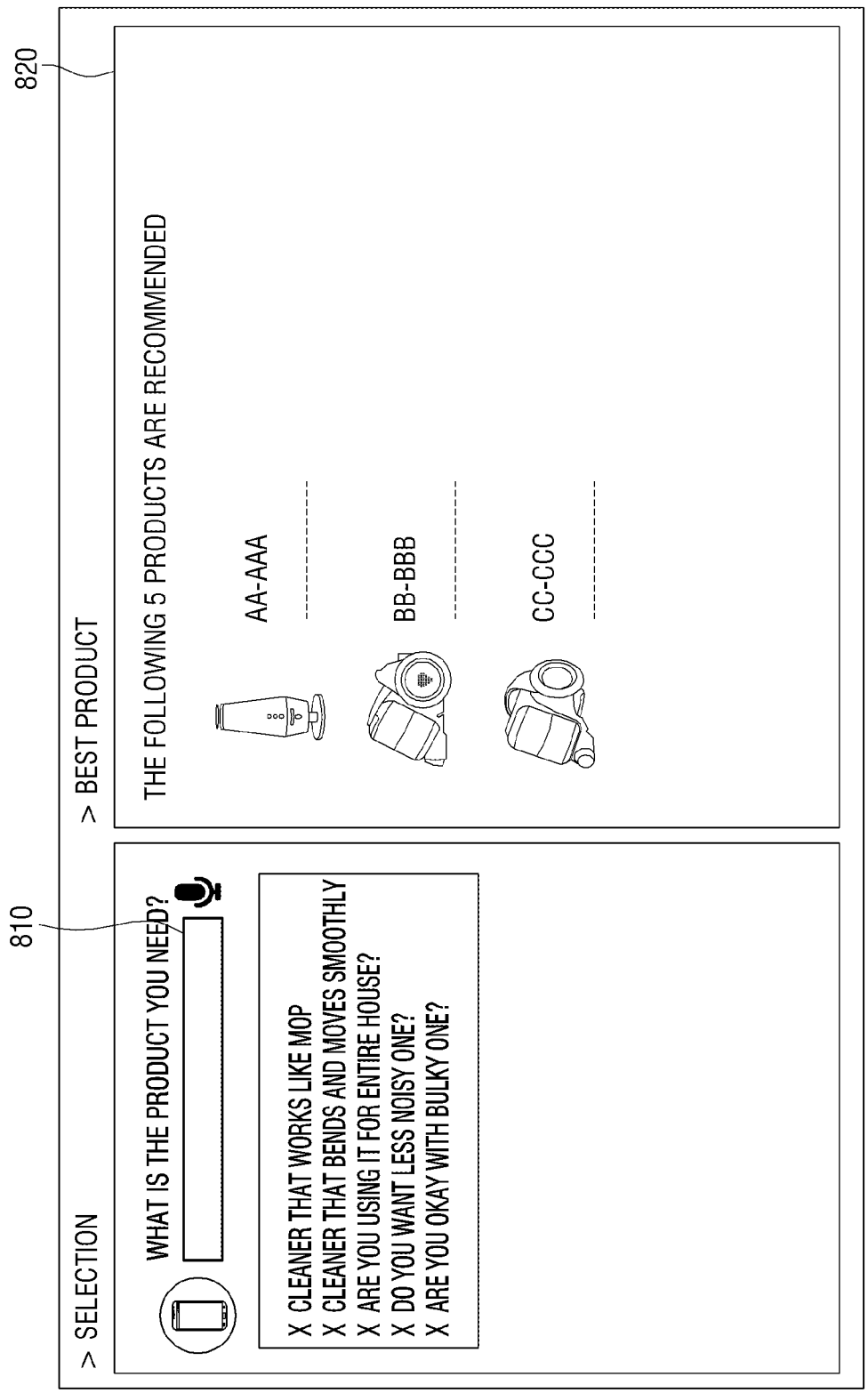
FIG. 8 is a diagram provided to describe a User Interface (UI) screen for inducing input of an uttered voice according to an embodiment disclosed herein.

FIG. 8 is a diagram provided to describe a User Interface (UI) screen for inducing input of an uttered voice according to an embodiment disclosed herein.

Referring to FIG. 8, the processor 230 of the user terminal apparatus 200 may display a UI screen 810 for inducing the input of the uttered voice. Further, the processor 230 may display a UI screen 820 showing a list of the devices on a certain side of the UI screen 810 for inducing the input of the uttered voice.

In response to receiving no uttered voice, the processor 230 may display a query for inducing the input of the uttered voice. For example, in response to receiving no uttered voice even though the processor 130 sensed that the user is around the user terminal apparatus 200, the processor 230 may display a query "Which device do you need?" to induce the input of the uttered voice, but this is only an example. The processor 230 may display a different type of query or perform no operation.

In response to a signal indicating that the specification information was not extracted from the uttered voice signal being received from the server apparatus 100, the processor 230 may display a query for inducing input of an additional uttered voice. For example, the processor 230 may display a query "Cleaner which bends and moves smoothly."

The processor 230 may generate the query for inducing the input of the additional uttered voice based on the information received from the server apparatus 100. For example, the server apparatus 100 may generate a signal for requesting for specific functions of the TV from the uttered voice signal "I need a TV" and transmit the generated signal to the user terminal apparatus 200. The processor 230 may display a query related to a TV "Do you need a display with high resolution?" based on the signal received from the server apparatus 100.

Further, the processor 230 may generate the query from the uttered voice. For example, in response to receiving the uttered voice "I need a TV," the processor 230 may do not extract the specification information on the functions but may extract a TV as a device type and display a query "Do you need a display with high resolution?" which is related to the TV.

In response to the number of the recommended devices included in recommended device information received from the server apparatus 100 exceeding a predetermined number, the processor 230 may display the query for inducing the input of the additional uttered voice. As an example, in response to the number of the devices having the detected specification information exceeding 20, the processor 230 may induce the input of the additional uttered voice and reduce the number of the devices to be less than 20. In response to the number of the devices which has the HDMI support function and the specification information corresponding to the uttered voice indicating that the user wants a TV with a display of more than 60 inches exceeding 20, the processor 230 may induce the input of the additional uttered voice "Wall-mount TV," for example.

The processor 230 may decide an order of the devices to be displayed from among the devices included in the recommended device information based on the number of the functions supported by the respective devices corresponding the extracted specification information. For example, in response to receiving the uttered voice "TV which interworks with a mobile phone," the processor 230 may generate a list of the TVs which support the HDMI support function and the Wi-Fi function for the interworking operation with the mobile phone. Further, the processor 230 may display a TV which supports both the HDMI support function and the Wi-Fi function at the top of the list, but not limited thereto. The processor 230 may move and display a TV which supports any one of the HDMI support function and the Wi-Fi function at the top of the list.

Figure 9:
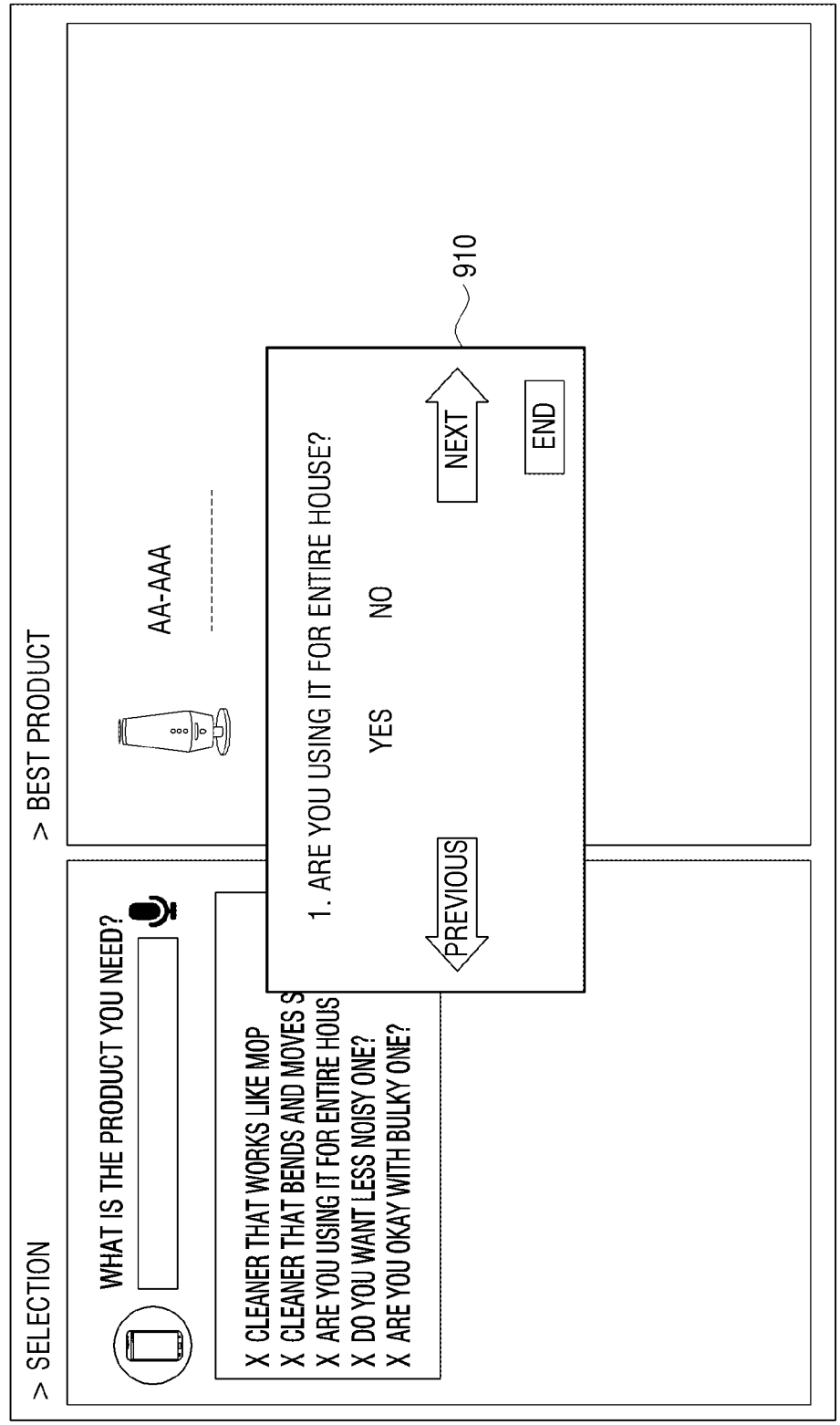
FIG. 9 is a diagram provided to describe a process of gradationally inducing input of an uttered voice according to an embodiment disclosed herein.

FIG. 9 is a diagram provided to describe a process of gradationally inducing input of an uttered voice according to an embodiment disclosed herein.

Referring to FIG. 9, the processor 230 may display a query 910 for gradationally inducing the input of the uttered voices, in response to receiving the uttered voices on the query, transmit the uttered voices to the server apparatus 100, and receive the recommended device information from the server apparatus 100.

For example, the processor 230 may display a query "Are you using it for the entire house?" In response to receiving the input of the uttered voice on the query, the processor 130 may display a gradational query "Do you want a less noisy one?" In this case, the processor 230 may display a query of a next step regardless of whether to receive the recommended device information corresponding to a query of a particular step from the server apparatus 100.

The server apparatus 100 may gradationally transmit the recommended device information corresponding to the uttered voice signals which were gradationally received to the user terminal apparatus 200.

The processor 230 may gradationally receive the recommended device information from the server apparatus 100 and display the received recommended device information. In this case, the processor 230 may separately display the recommended device information which were gradationally received or display only the recommended device information which overlap in each step.

The processor 230 may display a query which may be answered with 'yes' or 'no' or display a query requesting for the detailed information. For example, the processor 230 may display a query "What size display do you want for a mobile phone?"

In response to receiving a user input of finishing the operation while gradationally displaying the queries, the processor 230 may transmit only the information inputted so far to the server apparatus 100 and display the device list of the devices based on the received recommended device information, but not limited thereto. The processor 230 may gradationally display the queries and change the displayed device list in real time based on the recommended device information which are received gradationally.

Figure 10:
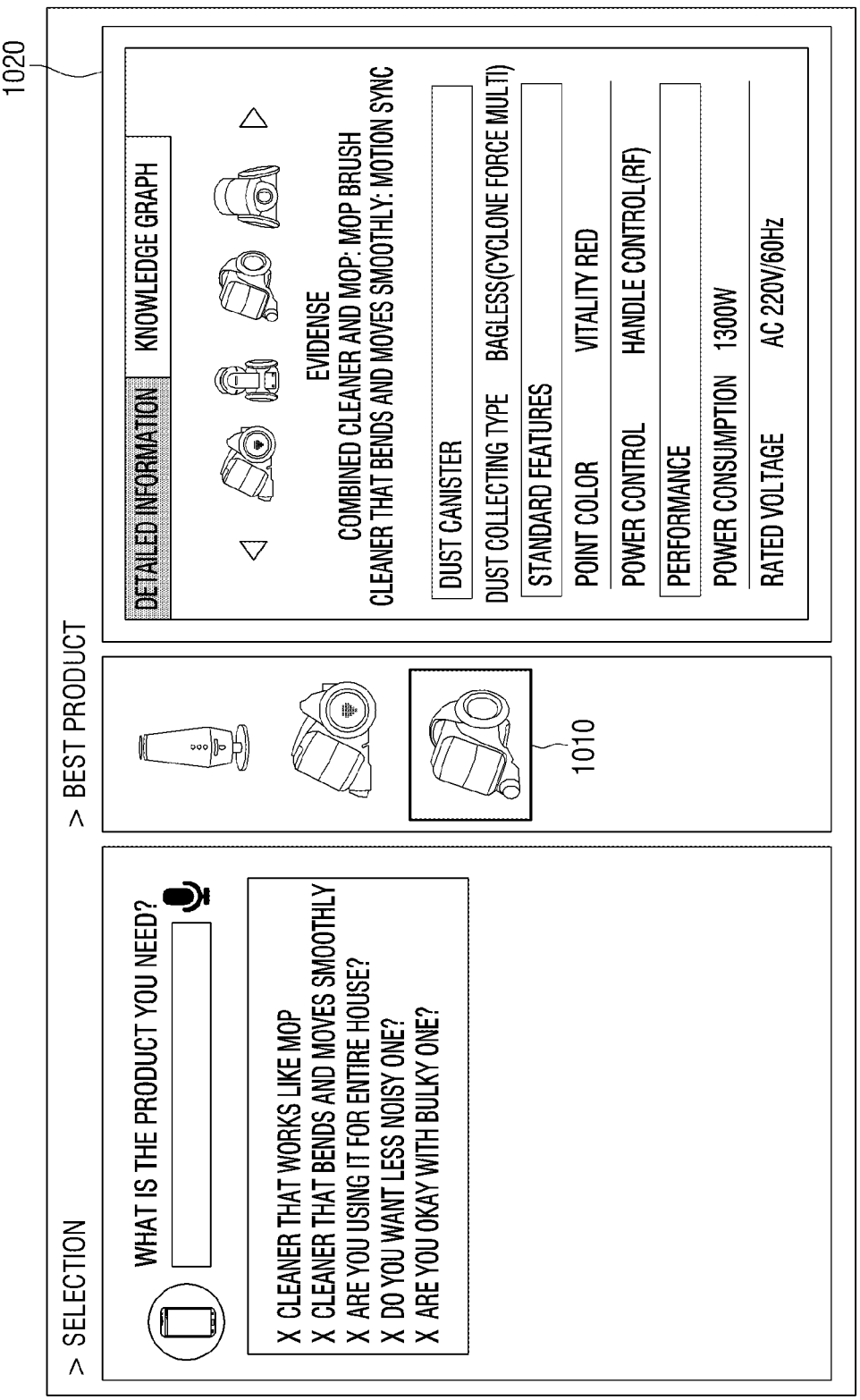
FIG. 10 is a diagram provided to describe an example of displaying detailed information on a selected device according to an embodiment disclosed herein.

FIG. 10 is a diagram provided to describe an example of displaying detailed information on a selected device according to an embodiment disclosed herein.

Referring to FIG. 10, in response to receiving a user input of selecting any one of the devices from the displayed device list, the processor 230 may display the detailed information on a selected device 1010 additionally on a certain side 1020 of the device list. For example, in response to receiving a user input of selecting the third device from the device list, the processor 230 may display the detailed information on the third device on the right side of the device list, but not limited thereto. The processor 230 may display the detailed information on the third device to overlap with the device list.

The processor 230 may display a part of the detailed information corresponding to the received uttered voice to be visually noticeable. By way of example, in response to the device list being generated from the uttered voice based on the power consumption, the processor 230 may display the power consumption in the detailed information in bold, but not limited thereto. The processor 230 may display the power consumption in a different color or by using any other method for distinguishing the power consumption from other information.

In FIG. 10, only the images of the devices are displayed in the device list, and the detailed information is displayed only in response to any one of the devices being selected, but not limited thereto. For example, the processor 230 may display brief device information in the device list together with the images of the devices. Further, the processor 230 may display the device and the detailed information together from the first.

Figure 11:
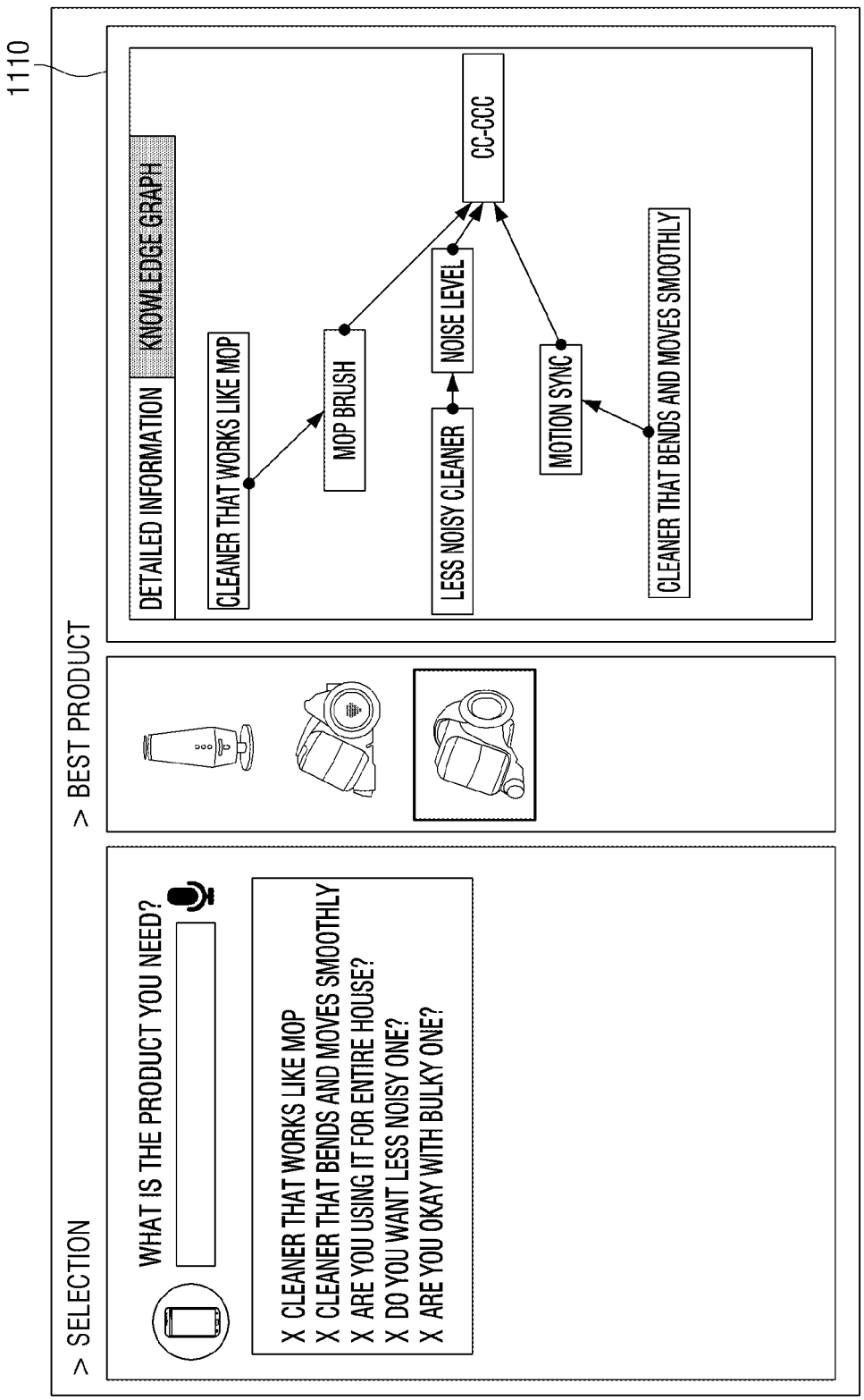
FIG. 11 is a diagram provided to describe an example of displaying specification information corresponding to an uttered voice as a graph according to an embodiment disclosed herein.

FIG. 11 is a diagram provided to describe an example of displaying specification information corresponding to an uttered voice as a graph according to an embodiment disclosed herein.

Referring to FIG. 11, in response to receiving a user input of selecting any one of the devices from the displayed device list, the processor 230 may display the specification information corresponding to the uttered voices which were inputted gradationally as a graph 1110. For example, in response to the input of the uttered voices regarding a cleaner that works like a mop, a cleaner that is less noisy, and a cleaner that bends and moves smoothly being received, and any one of the devices being selected from the device list of the devices corresponding to the received uttered voices, the processor 230 may display the specification information as the graph 1110 in order to show which process was executed to select the device, but not limited thereto. The processor 230 may display the specification information of the devices corresponding to the uttered voices as a table.

FIGS. 12A to 12F are diagrams provided to describe an example of a UI provided by a user terminal apparatus 200.

As illustrated in FIG. 12A, in response to a predetermined application being executed, the processor 230 may display an initial screen for searching for a device. The processor 230 may provide a 'Find' icon 1210 and a 'Sense' icon 1220 for searching for the device.

In response to the 'Sense' icon 1220 being selected, the processor 230 may sense a device around the user terminal apparatus 200 by using a sensor of the user terminal apparatus 200. For example, the processor 230 may sense the device around the user terminal apparatus 200 by inactivating the Bluetooth function and display the sensed device.

In this case, the processor 230 may receive the specification information on the sensed device from the device and display the received specification information. Or, the processor 230 may receive only the identification information from the sensed device, receive the information corresponding to the received identification information from the server apparatus, and display the received information.

In response to the 'Find' icon 1210 being selected, the processor 230 may display a screen illustrated in FIG. 12B. To be specific, the processor 230 may receive the user uttered voice and configure and display a screen corresponding to the received user uttered voice. For example, the processor 230 may provide a screen where the functions of the TV are categorized based on the uttered voice of the user who wants to search for the TV.

In FIG. 12B, the categories of the TV includes 'Exterior,' 'Convenience,' and 'Screen,' but this is only an example. The functions of the TV may be categorized by any criteria.

In response to the category 'Convenience' being selected, the processor 230 may provide 'Content Sharing' or 'Easy to Configure' as the lower categories.

Figure 12C:
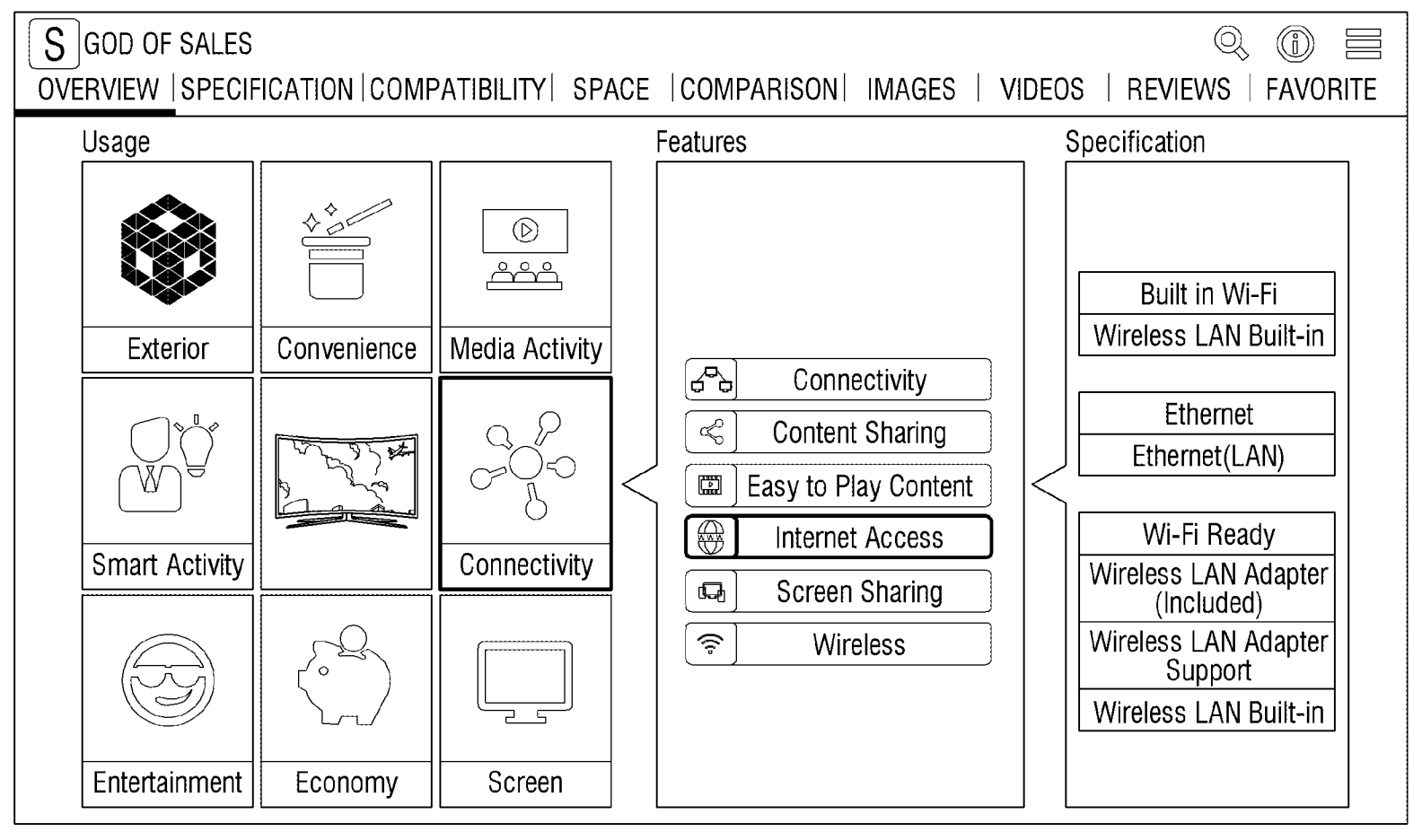

As illustrated in FIG. 12C, in response to any one of the lower categories being selected, the processor 230 may provide the information on the specific functions corresponding to the selected lower category. For example, in response to 'Connectivity' being selected as a higher category and 'Internet Access' being selected as the lower category, the processor 230 may display 'Built in Wi-Fi,' 'Ethernet,' and 'Wi-Fi Ready.'

Figure 12D:
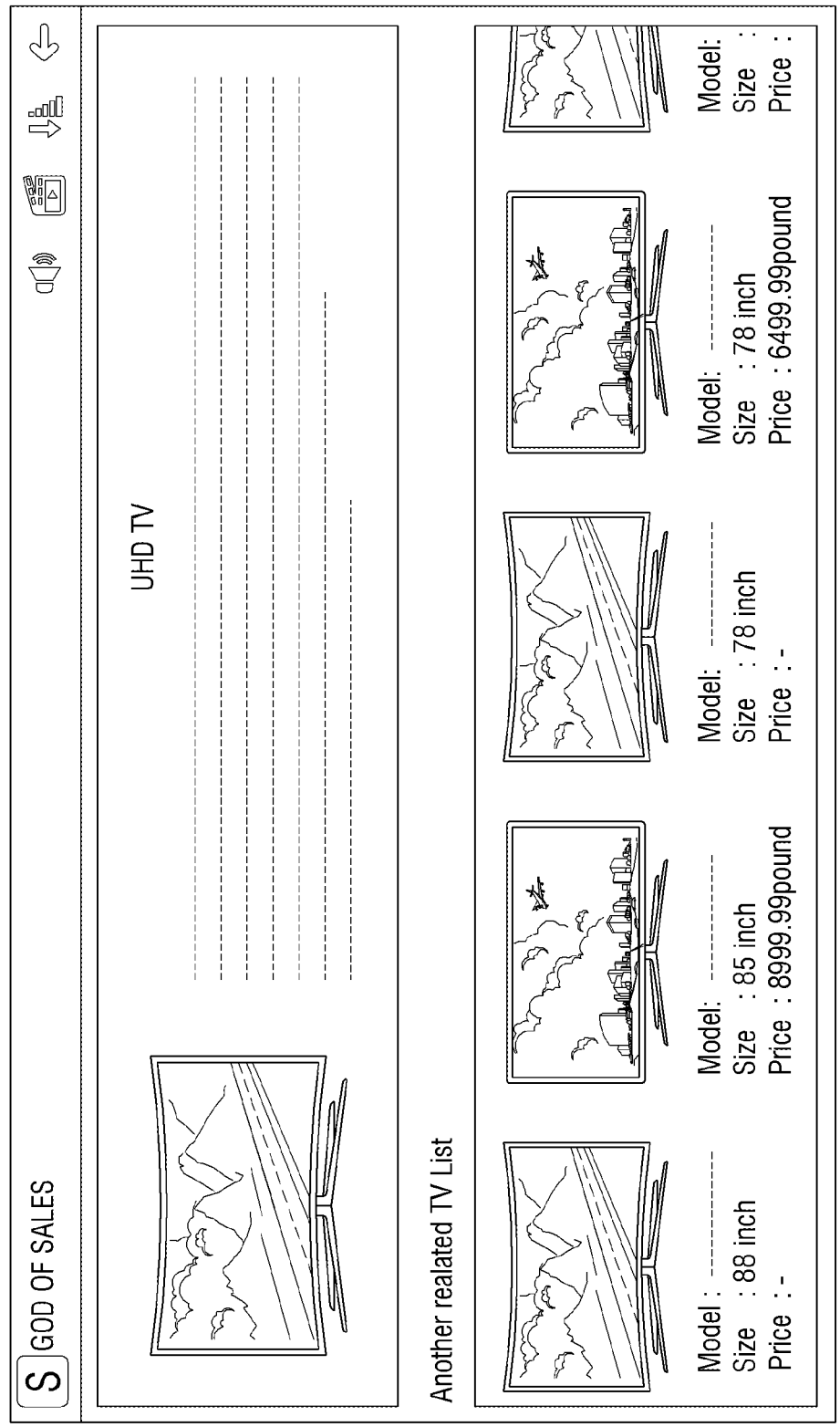

As illustrated in FIG. 12D, in response to any one of the information on the specific functions being selected, the processor 230 may configure and display a device list of the devices which provide the selected function. For example, the processor 230 may display a TV sold the most among the TVs having the selected function on an upper part of a display area and display the device list of other TVs having the selected function on a lower part of the display area, but not limited thereto. The processor 230 may arrange the devices by any other arrangement criteria, for example, a release date or a price of the devices.

The processor 230 may provide the entire specification information on the device displayed on the upper part of the display area and provide only a part of the specification information on the devices displayed on the lower part of the display area. When the user does not want the device displayed on the upper part, the processor 230 may control to select another device on the lower part and display the selected device on the upper part of the display area.

The user may select a plurality of functions to reduce the number of the provided devices. For example, the user may reduce the number of the devices by setting the conditions for the internet connection or the price.

Figure 12E:
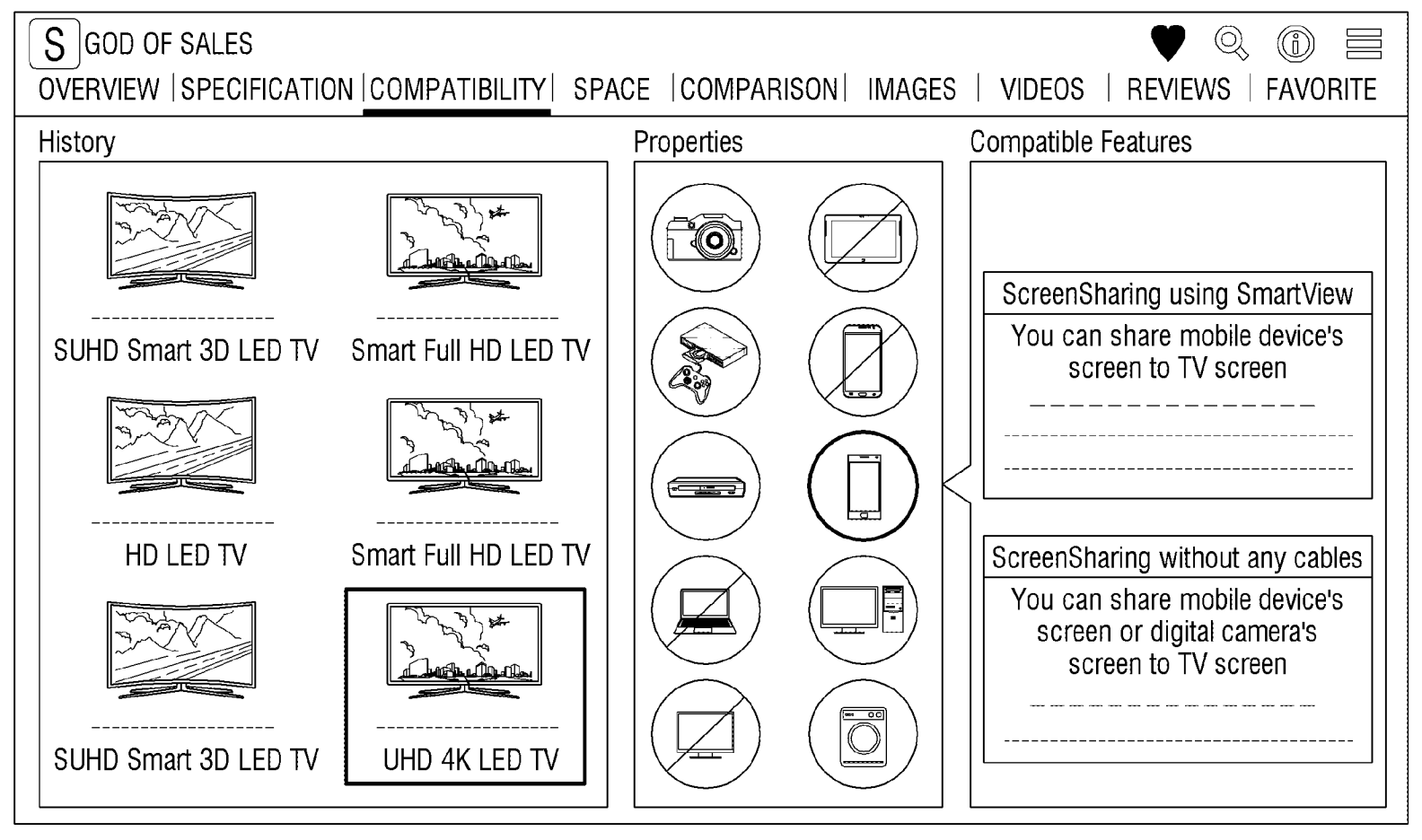

The processor 230 may provide the information on the compatibility between devices. For example, as illustrated in FIG. 12E, in response to the user selecting a TV and then selecting a smart phone, the processor 230 may provide the information indicating that the selected TV and smart phone are able to share a screen through a 'Smart View' function or share the screen with no cable. In this case, the processor 230 may further provide the information indicating that a camera or a game console is able to share the screen with the selected TV, but a notebook computer or a tablet PC is unable to share the screen with the selected TV.

Figure 12F:
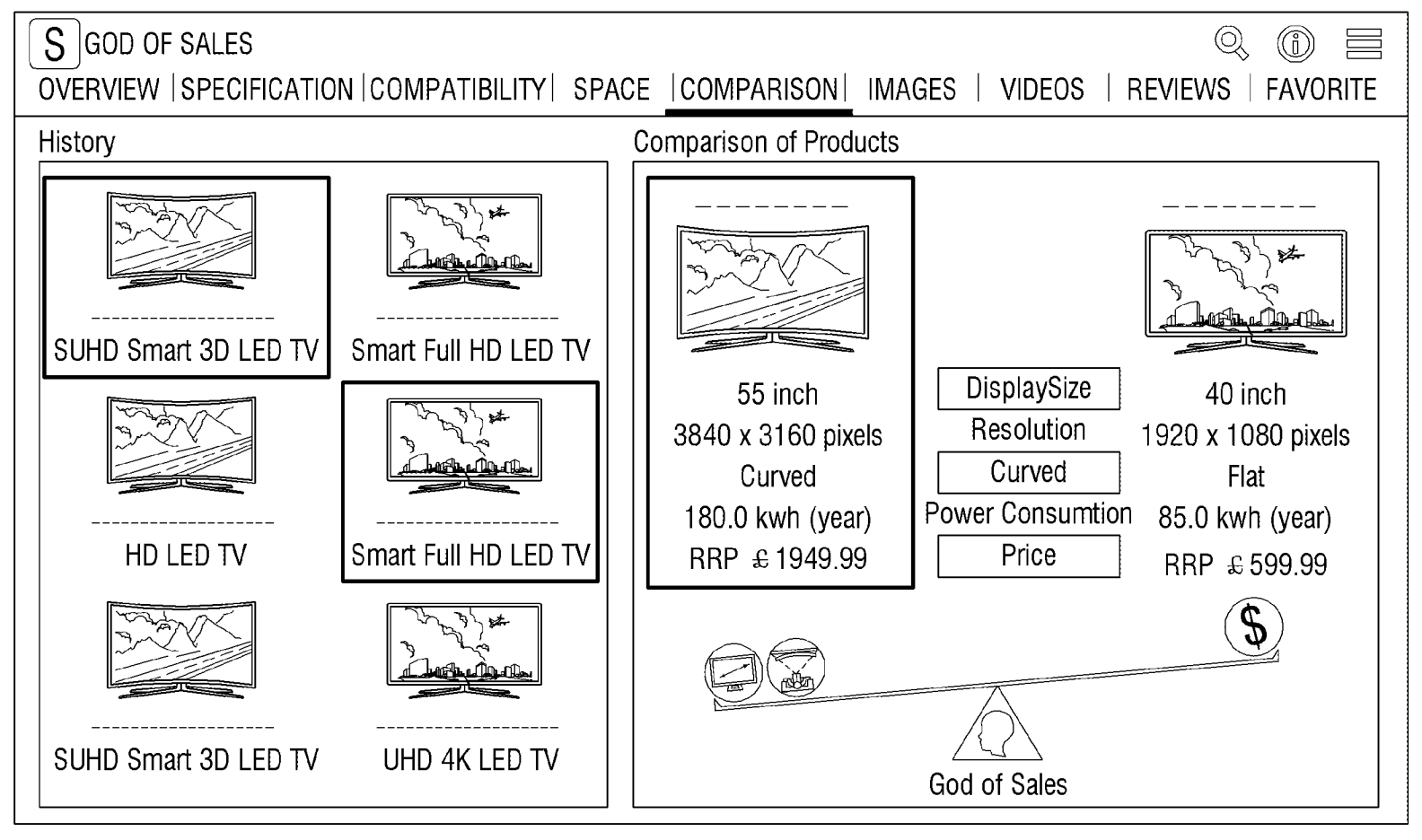

The processor 230 may compare a plurality of devices based on the user preference. As illustrated in FIG. 12F, the processor 230 may recommend a device which is more suitable for the user among a plurality of TVs selected by the user based on a size or a curved shape of a display of the TVs.

Particularly, the processor 230 may compare the plurality of devices by assigning a weighted value according to the user preference. For example, the processor 230 may compare the plurality of devices by assigning the weighted value of the size or the curved shape of the display to be higher than the weighted value of the price. The weighted value may be set by the user or may have been preset based on the previous sales data.

In FIGS. 12A to 12F, the operations of the processor 230 were described by taking an example of a TV, but the operations may be applied to any other type of devices in the same manner.

Figure 13A:
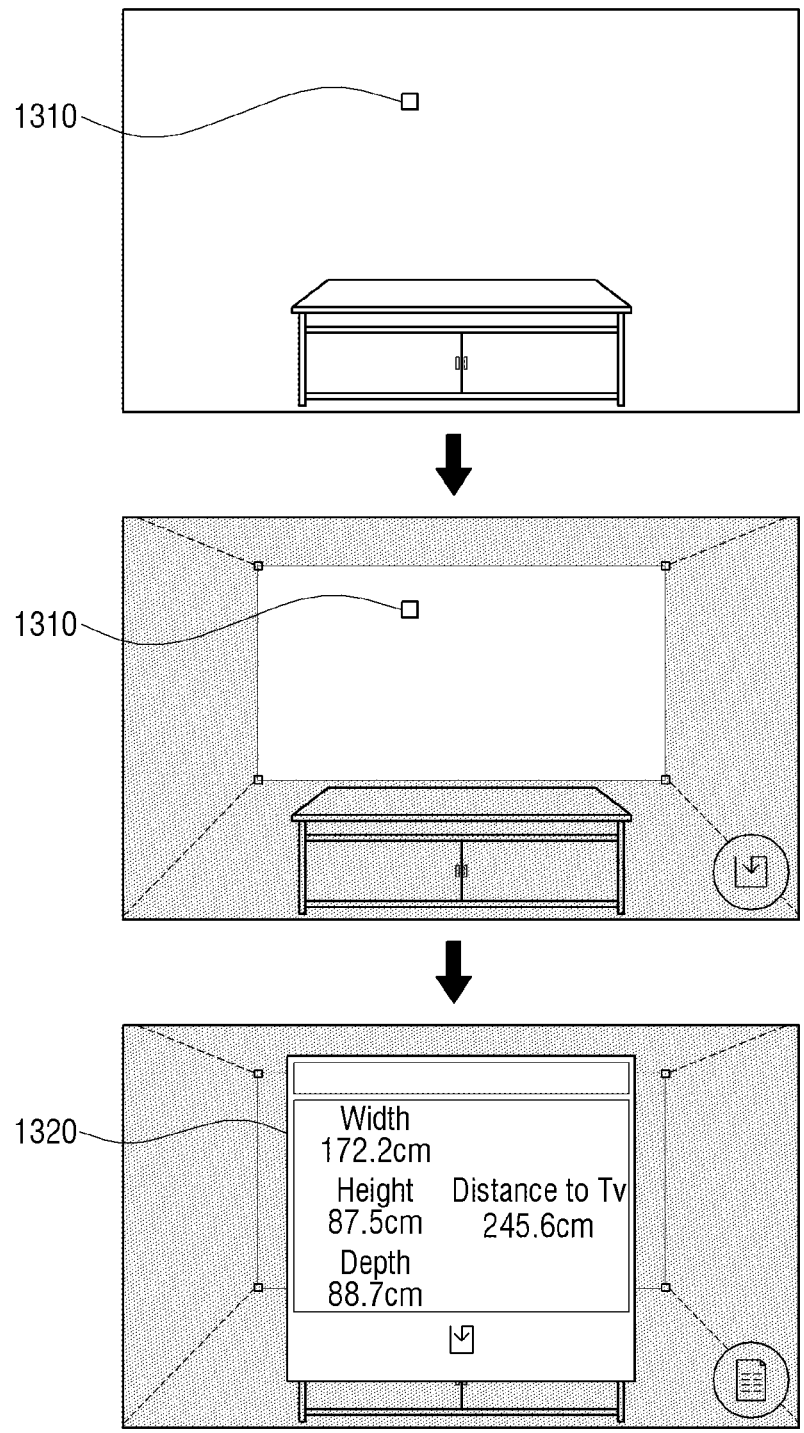
FIGS. 13A and 13B are diagrams provided to describe an example of a method for deciding recommended device information based on space information.
Figure 13B:
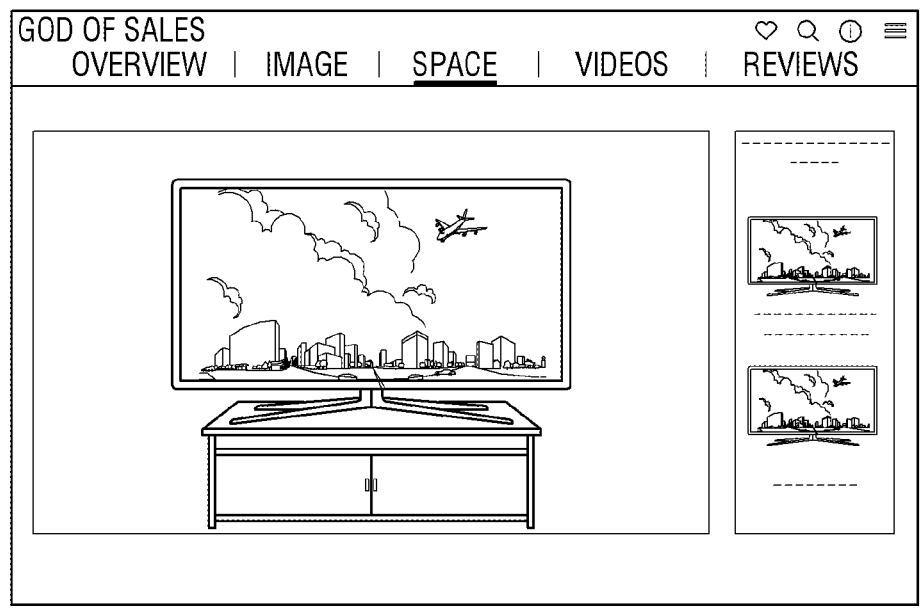

FIGS. 13A and 13B are diagrams provided to describe an example of a method for deciding recommended device information based on space information.

FIG. 13A is a diagram provided to describe a method for calculating space information from a photographed image. In this case, the photographed image may be an image photographed by the user terminal apparatus 200. The user terminal apparatus 200 may further include a camera. The processor 230 may transmit the image photographed by the camera to the server apparatus 100.

In response to an image of a specific space photographed through the user terminal apparatus 200 being received from the user terminal apparatus 200, the processor 130 of the server apparatus 100 may calculate a size of the specific space based on the received image and decide the device information on the device corresponding to the calculated size as the recommended device information.

As illustrated in the first drawing of FIG. 13A, in response to sensing an identification image 1310 included in the received image, the processor 130 may calculate the size of the specific space based on the pre-stored information on a size and a shape of the identification image 1310.

In this case, as illustrated in the second drawing of FIG. 13A, the user may designate an area to be measured. The processor 130 may calculate a size of the area to be measured by sensing the identification image 1310 in the area even though the area to be measured was designated by the user.

The storage 120 may store the information on the identification image 1310. The processor 130 may calculate the size of the specific space by using the information on the identification image 1310 stored in the storage 120.

As an example, in response to the identification image 1310 being a square in 8 by 8 centimeters, the processor 130 may calculate the size of the specific space based on the number of pixels of the identification image 1310 in the photographed image.

The processor 130 may calculate a photographing angle between a surface to be photographed and a photographing device based on the shape of the identification image 1310. The processor 130 may calculate the size of the specific space based on the photographing angle.

As illustrated in the third drawing of FIG. 13A, the processor 130 may provide the information on the calculated size of the specific space. The processor 130 may provide the size information including at least one of a width, a height, a depth, and a distance of the specific space.

The processor 130 may transmit the size information on the calculated size of the specific space to the user terminal apparatus 200. Or, the processor 130 may generate the recommended device information based on the size information on the calculated size of the specific space and transmit the generated recommended device information to the user terminal apparatus 200.

In this case, the storage 120 may store the information on a width, a length, and a height of the devices. Further, the storage 120 may store information on a required space considering the characteristics in use of the devices. For example, the storage 120 may store the information on a space required to open and close a door of a refrigerator, the information on a space considering a viewing distance of a TV, and the information on a coverage of an air purifier.

In FIG. 13A, the server apparatus 100 calculates the size of the specific space, but not limited thereto. For example, the user terminal apparatus 200 may calculate the size of the specific space.

The processor 230 of the user terminal apparatus 200 may photograph an image by using the camera. In response to the identification image included in the photographed image being sensed, the processor 230 may calculate the size of the specific space based on the pre-stored information on the size and the shape of the identification image.

Further, the processor 230 may display the device information on the device corresponding to the size of the specific space photographed by the camera out of the recommended device information.

As illustrated in FIG. 13B, the processor 230 may provide one of the devices corresponding to the size of the specific space to be virtually overlaid in a specific space. In this case, the processor 230 may display a preview image photographed by the camera and virtually display one of the recommended devices in the specific space. Accordingly, the user may determine whether the device is suitable for the specific space before purchasing the device.

Figure 14:
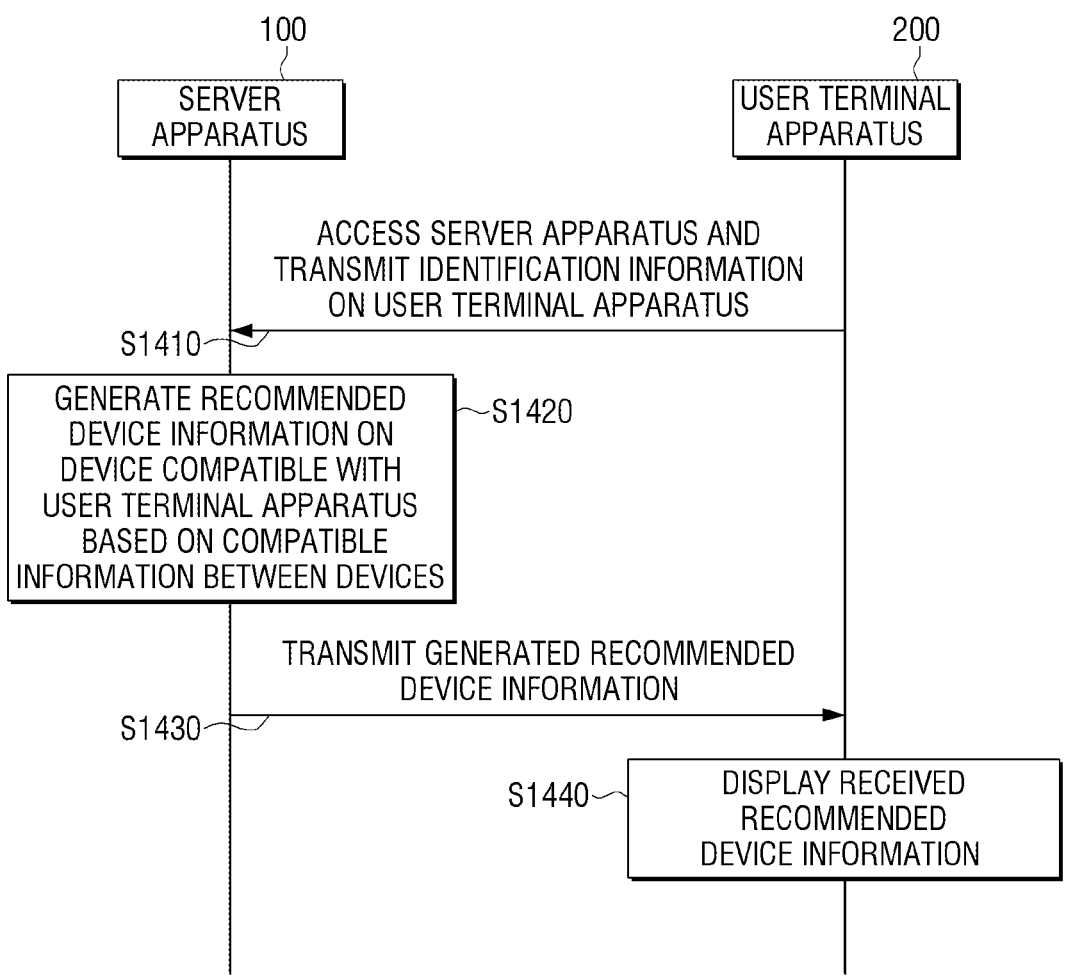
FIG. 14 is a sequence diagram provided to describe an operation of a server apparatus and a user terminal apparatus according to an embodiment disclosed herein.

FIG. 14 is a sequence diagram provided to describe an operation of a server apparatus 100 and a user terminal apparatus 200 according to an embodiment disclosed herein.

The user terminal apparatus 200 may access the server apparatus 100 and the identification information on the user terminal apparatus 200 to the server apparatus (S1410). Further, the user terminal apparatus 200 may transmit the identification information on another device to the server apparatus 100.

The user terminal apparatus 200 may transmit the authentication information for accessing the user account of the user terminal apparatus 200 to the server apparatus 100. The information on the user account may have been stored in the server apparatus 100. The user may execute a certain application in the user terminal apparatus 200 and then access the user account. The user terminal apparatus 200 may encrypt the authentication information and transmit the encrypted authentication information to the server apparatus 100.

The server apparatus 100 may store the compatible information between devices. The server apparatus 100 may store the specification information on the device. Further, the server apparatus 100 may store the information on the user account or manage the user account. For example, the server apparatus 100 may link the information on the user's device with the user account and store the information.

In response to the user terminal apparatus 200 accessing the server apparatus 100 and the identification information on the user terminal apparatus 200 being received from the user terminal apparatus 200, the server apparatus 100 may generate the recommended device information on the device compatible with the user terminal apparatus 200 based on the stored information (S1420). Subsequently, the server apparatus 100 may transmit the generated information to the user terminal apparatus 200 (S1430).

The server apparatus 100 may decide the device information on the device compatible with the user terminal apparatus 200 and a user device registered at the user account of the user terminal apparatus 200 as the recommended device information based on the information on the registered user device and transmit the decided device information to the user terminal apparatus 200.

The user terminal apparatus 200 may receive the recommended device information on the device compatible with the user terminal apparatus 200 from the server apparatus 100 and display the received recommended device information (S1440).

The user terminal apparatus 200 may receive the recommended device information on the device compatible with the user terminal apparatus 200 and the user device registered at the authenticated user account from the server apparatus 100 and display the received recommended device information.

Figure 15:
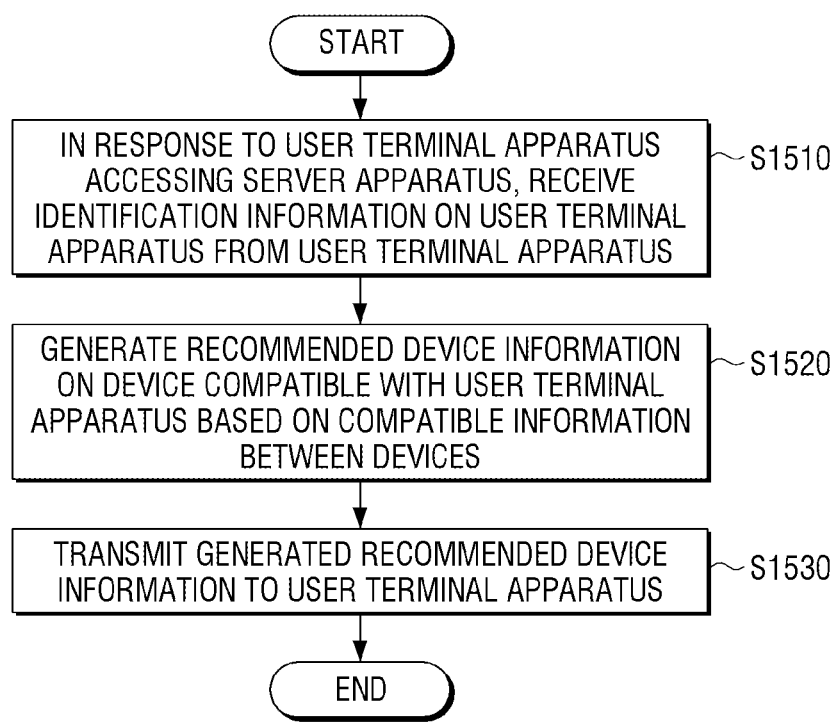
FIG. 15 is a flowchart provided to describe a method for controlling a server apparatus according to an embodiment disclosed herein.

FIG. 15 is a flowchart provided to describe a method for controlling a server apparatus according to an embodiment disclosed herein.

In response to the user terminal apparatus accessing the server apparatus, the identification information on the user terminal apparatus is received from the user terminal apparatus (S1510). Subsequently, the recommended device information on a device compatible with the user terminal apparatus is generated based on the compatible information between devices (S1520). The generated recommended device information is transmitted to the user terminal apparatus (S1530).

The receiving (S1510) may include receiving a user uttered voice signal inputted through the user terminal apparatus from the user terminal apparatus. The generating (S1520) may include deciding the device information on a device associated with at least one text included in the uttered voice signal as the recommended device information.

The receiving (S1510) may include receiving an image of a specific space photographed through the user terminal apparatus from the user terminal apparatus. The generating (S1520) may include calculating a size of the specific space based on the received image and deciding the device information on a device corresponding to the calculated size of the specific space as the recommended device information.

In this case, the calculating may include sensing an identification image included in the received image and calculating the size of the specific space based on the pre-stored information on a size and a shape of the identification image.

The generating (S1520) may include deciding the device information on a device compatible with the user terminal apparatus and a user device registered at a user account of the user terminal apparatus as the recommended device information based on the information on the registered user device.

Figure 16:
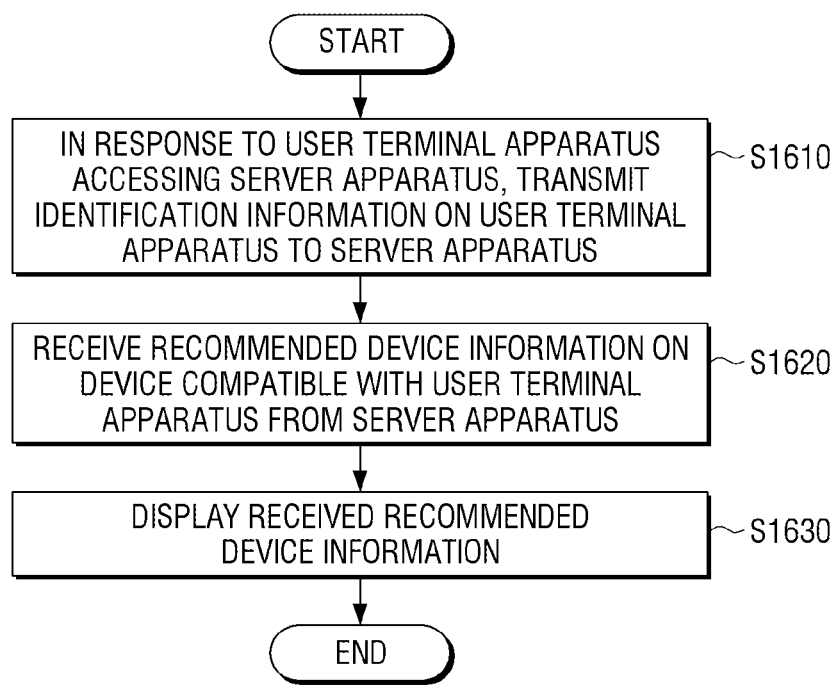
FIG. 16 is a flowchart provided to describe a method for controlling a user terminal apparatus according to an embodiment disclosed herein.

FIG. 16 is a flowchart provided to describe a method for controlling a user terminal apparatus according to an embodiment disclosed herein.

In response to the user terminal apparatus accessing the server apparatus, the identification information on the user terminal apparatus is transmitted to the server apparatus (S1610). Subsequently, the recommended device information on the device compatible with the user terminal apparatus is received from the server apparatus (S1620). The received recommended device information is displayed (S1630).

In this case, the method may further include receiving a user uttered voice. The displaying (S1630) may include displaying the device information on a device associated with at least one text included in the user uttered voice out of the recommended device information.

The displaying (S1630) may include displaying the device information on a device corresponding to a size of the specific space photographed by a camera out of the recommended device information.

In this case, the method may further include photographing an image by using the camera, sensing an identification image included in the photographed image, calculating the size of the specific space based on the pre-stored information on a size and a shape of the identification image.

The transmitting (S1610) may include transmitting the authentication information for accessing the user account of the user terminal apparatus to the server apparatus. The receiving (S1620) may include receiving the recommended device information on the device compatible with the user terminal apparatus and the user device registered at the authenticated user account from the server apparatus.

In the above embodiment, the server apparatus receives the identification information from the user terminal apparatus and provides the recommended device information, but not limited thereto. Hereinafter, an extended embodiment is provided.

Figure 17:
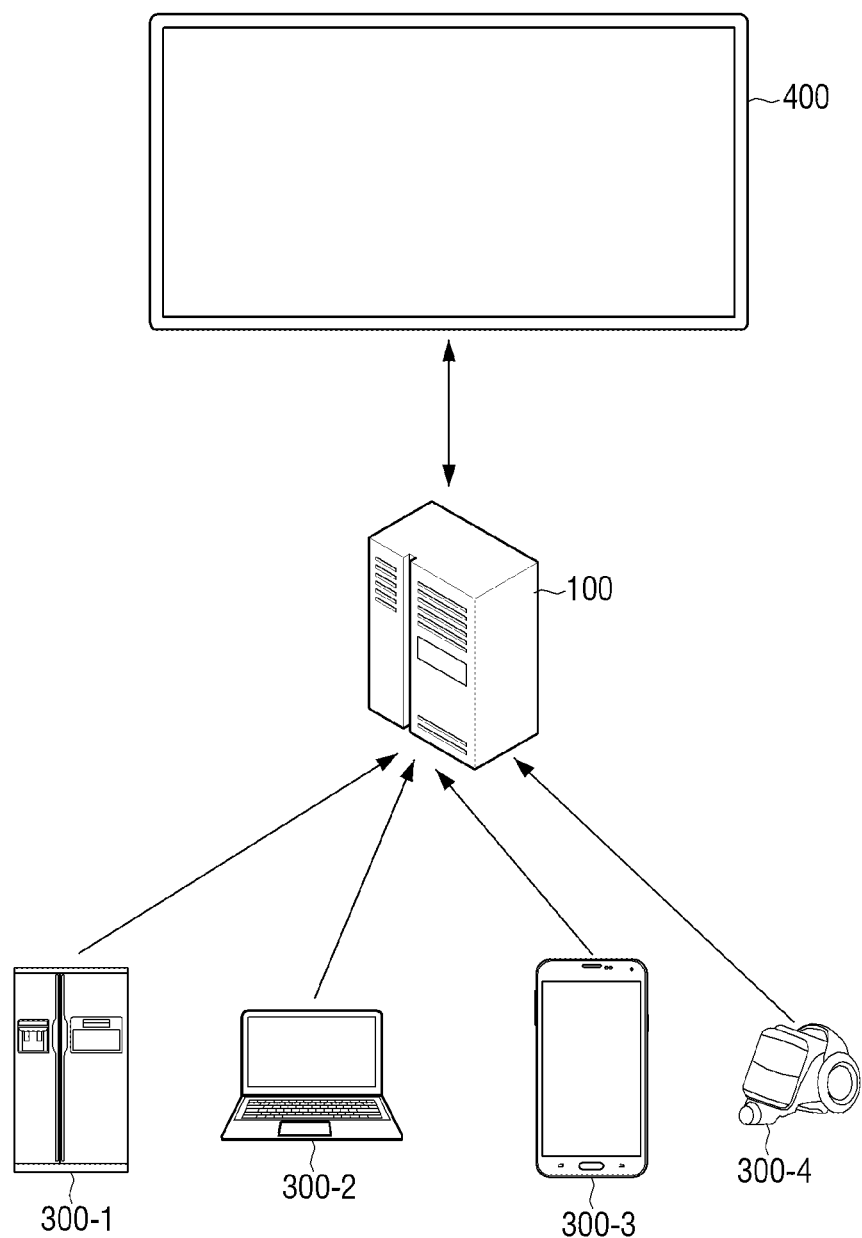
FIG. 17 is a diagram provided to describe a method for providing device information according to an extended embodiment disclosed herein.

FIG. 17 is a diagram provided to describe a method for providing device information according to an extended embodiment disclosed herein.

As illustrated in FIG. 17, an electronic system may include a server apparatus 100, a plurality of devices 300-1, 300-2, 300-3, 300-4, and a Large Format Display (LFD) device 400. The server apparatus 100, the plurality of devices 300-1, 300-2, 300-3, 300-4, and the LFD device 400 may be connected to the same network. For example, the server apparatus 100, the plurality of devices 300-1, 300-2, 300-3, 300-4, and the LFD device 400 may be arranged in the same store and connected to one network.

The plurality of devices 300-1, 300-2, 300-3, 300-4 may have a sensor, respectively. In response to sensing a user manipulation through the sensors, the plurality of devices 300-1, 300-2, 300-3, 300-4 may transmit the information on the user manipulation to the server apparatus 100. For example, when the user opens a door of the refrigerator 300-1 in the store, the refrigerator 300-1 may transmit a signal indicating that the door opened to the server apparatus 100.

The server apparatus 100 may extract related information based on the received sensing information and transmit the extracted information to the LFD device 400. For example, in response to receiving a sensing result from the refrigerator 300-1, the server apparatus 100 may transmit the information on the refrigerator 300-1 to the LFD device 400. The LFD device 400 may display the received information, and the user may check the detailed information on the refrigerator 300-1.

The transmitted information may include the detailed specification information on a device and the information corresponding to the sensing information. For example, the transmitted information may include a time when the door opened, the information on an opening degree of the door, and the information on the amount of energy additionally consumed based on the time when the door opened, in addition to the detailed specification information on the refrigerator 300-1.

In response to receiving the sensing result, the server apparatus 100 may generate the information on a device compatible with the corresponding device and transmit the generated information to the LFD device 400. For example, in response to receiving the sensing result from the notebook computer 300-2, the server apparatus 100 may generate the recommended device information on the device compatible with the notebook computer 300-2 and transmit the generated recommended device information to the LFD device 400.

To be specific, the server apparatus 100 may generate the recommended device information based on the sensing result. For example, in response to the user executing a Bluetooth function of the notebook computer 300-2, the notebook computer 300-2 may transmit the information on the execution of the Bluetooth function to the server apparatus 100. The server apparatus 100 may generate the recommended device information on the device which supports the Bluetooth function and transmit the generated recommended device information to the LFD device 400.

The server apparatus 100 may recommend the same type of product based on the sensing result. For example, in response to the user manipulating the smart phone 300-3, the server apparatus 100 may transmit the information on the smart phone 300-3 manipulated by the user to the LFD device 400 and may further transmit the information on another smart phone to the LFD device 400, but not limited thereto. The server apparatus 100 may transmit the information on a device which supports the same hardware standard to the LFD device 400, as well as the information on the same type of product.

The LFD device 400 may perform a promotion function or an information delivery function as a large display. The LFD device 400 may be a stand-alone device consisting of one panel or a video wall device consisting of several panels which are connected.

The LFD device 400 may display the information received from the server apparatus 100. For example, the LFD device 400 may receive image information from the server apparatus 100 and display the received image information in the entire display area.

The LFD device 400 may receive a plurality of contents from the server apparatus 100 and rearrange and display the received contents. For example, the LFD device 400 may receive a text and a video from the server apparatus 100 and arrange and display the received text and video according to a predetermined layout.

Further, the LFD device 400 may display preset content and the information received from the server apparatus 100 at the same time. For example, the LFD device 400 may display advertisement content of the store where the LFD device 400 is installed in a certain area of the display and display the information received from the server apparatus 100 in the other area of the display.

Figure 18A:
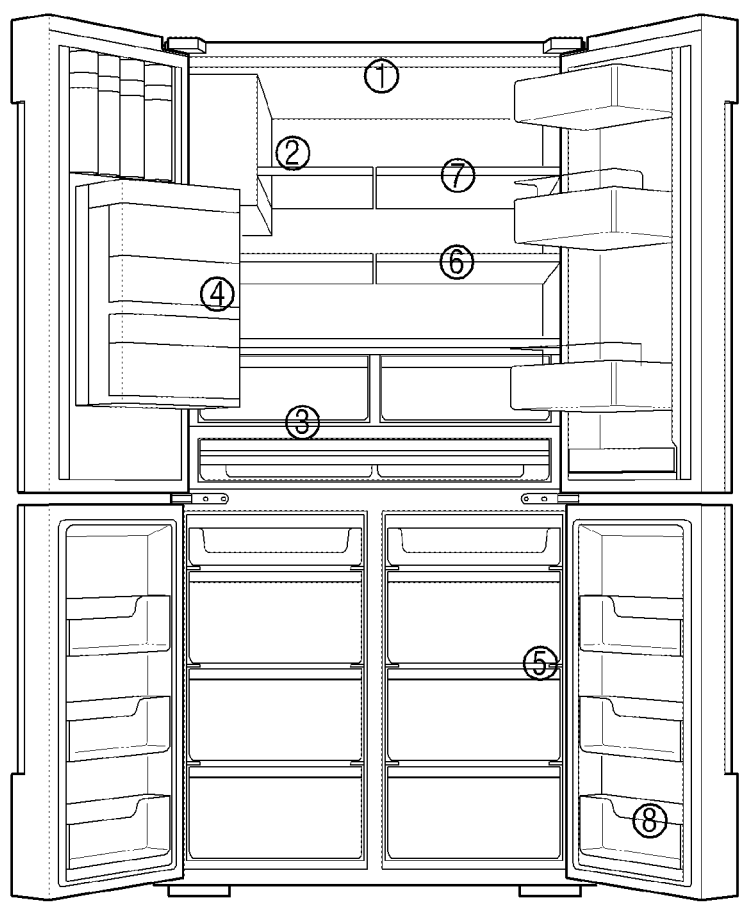

FIGS. 18A and 18B are diagrams provided to describe an example of a sensor installed in a device.

As illustrated in FIG. 18A, a device may include a sensor in the respective components or may link main functions of the device with the sensor. For example, a refrigerator may include a sensor for sensing an opening/closing of a door, sense the opening/closing of the door through the sensor, and provide the detailed information. The provided functions and sensor may vary depending upon a device.

In FIG. 18A, the refrigerator includes eight sensors, but any number of sensors may be provided according to necessity.

FIG. 18B illustrates the detailed information on the eight sensors. The information may have been stored in the server apparatus 100.

To be specific, the server apparatus 100 may store the information on the specification/function name, the applied sensors, and operation methods. For example, in response to receiving a signal indicating that a first sensor operated, the server apparatus 100 may sense that the door of the refrigerator opened or was closed. In this case, the first sensor may be a magnetic door sensor.

The server apparatus 100 may extract a device to be displayed in the LFD device 400 and the specification information on the device based on the sensed information and transmit the extracted specification information to the LFD device 400. For example, in response to receiving the signal indicating that the first sensor operated, the server apparatus 100 may transmit the information on the function provided through the door of the refrigerator to the LFD device 400. The information on the function provided through the door of the refrigerator may include a lighting control function according to the opening/closing of the door of the refrigerator.

Figure 19A:
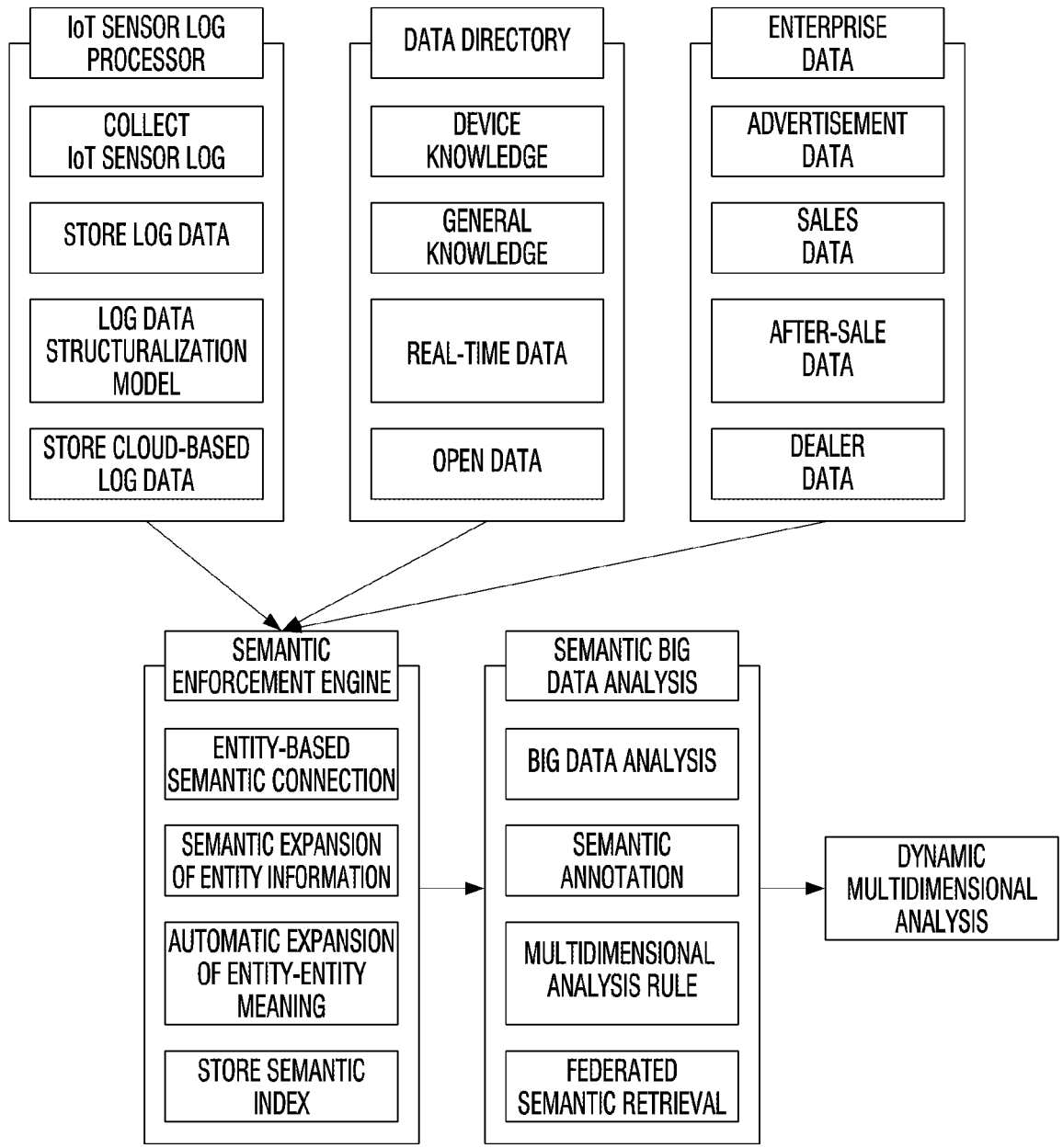
FIGS. 19A, 19B and 19C are diagrams provided to describe an example of a method for processing data of a server apparatus 100.
Figure 19B:
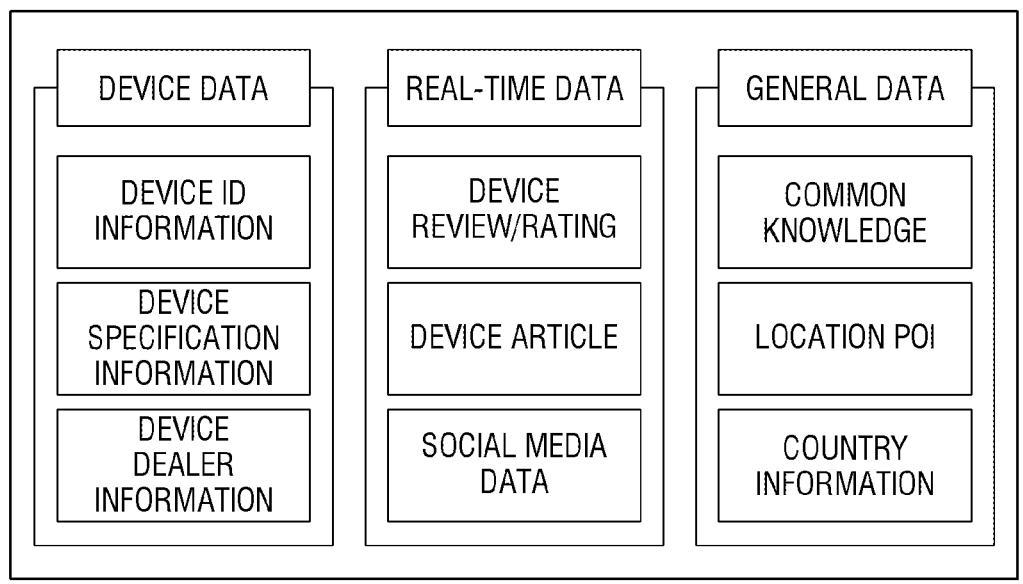
Figure 19C:
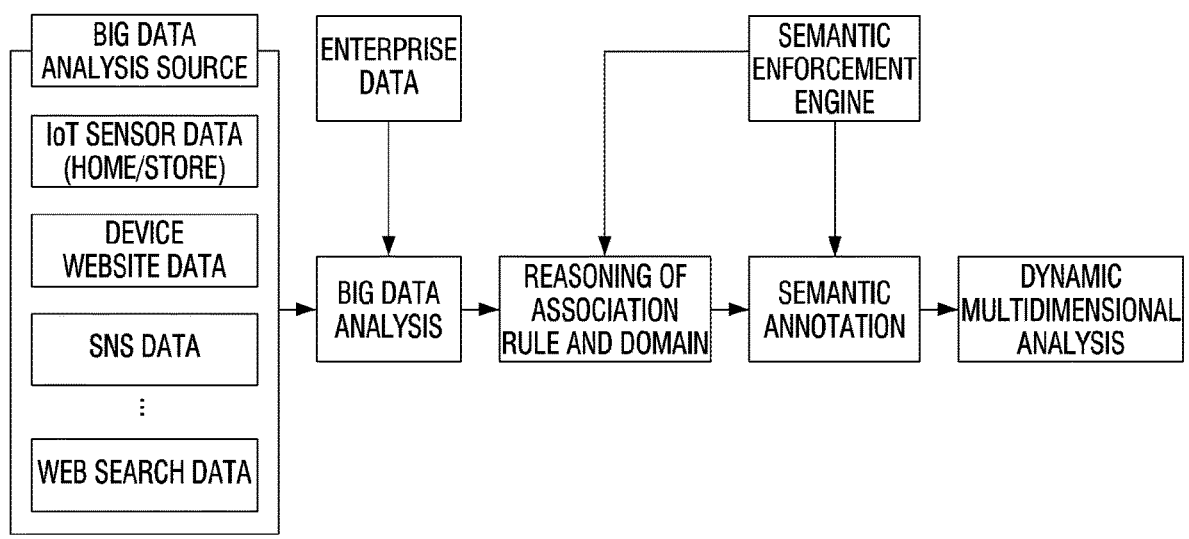

FIGS. 19A and 19C are diagrams provided to describe an example of a method for processing data of a server apparatus 100.

The server apparatus 100 may collect data through various routes. To be specific, the server apparatus 100 may collect an IoT sensor log processor, a data directory, and enterprise data.

The IoT sensor log processor may collect the data from the sensor of the device and store the log data. Further, the IoT sensor log processor may structuralize the log data and configure a cloud with another device which performs the same functions as the server apparatus 100 in order to share the data.

The server apparatus 100 may collect device knowledge, general knowledge, real-time data, and open data and configure the data directory. The data may be collected in real time or periodically.

For example, as illustrated in FIG. 19B, the server apparatus 100 may sort and store the data on the device, the real-time data on the device, and the general data. To be specific, the data on the device may include ID information, specification information, and dealer information on the device. The real-time data on the device may include reviews/rating, articles, and social media data on the device. The general data may include the common knowledge and location Point of Interest (POI) on the device.

By way of example, the server apparatus 100 may extract the device information 'refrigerator' and the function information 'cooling system' from the information 'triple independent cooling.' The server apparatus 100 may search and store the news or reviews related to the 'triple independent cooling.' Further, the server apparatus 100 may store sales information on the device which provide the function.

The server apparatus 100 may collect the advertisement data, sales data, after-sales service data, and dealer data and configure the enterprise data. In the same manner as described above, the enterprise data may be collected in real time or periodically.

The server apparatus 100 may semantically link the collected data with a knowledge graph through a semantic reinforcement engine. Further, the server apparatus 100 may generate a dynamic multidimensional analysis result through the semantic big data analysis. The dynamic multidimensional analysis result may be transmitted to the user terminal apparatus 200 or the LFD device and displayed.

The server apparatus 100 may extract and structuralize the log data by using the semantic reinforcement engine and link the data directory and the log data. Subsequently, the server apparatus 100 may recognize and map an entity. In this case, the entity refers to a unit of semantic information and may include diverse information, such as, the functions or a price of a device.

The server apparatus 100 may expand the entity information based-semantics and assign the automatic rules through the semantic reasoning between entities. In this case, the semantics may refer to a method of expressing relation-semantic information between the information on the resources and the resources to be in the form of ontology which is processible by a computer and allowing an automated computer to process the ontology in a distributed environment.

Subsequently, the server apparatus 100 may extract text based on the real-time data and expand the real-time data for the respective entities automatically. The server apparatus 100 may generate an semantic index and store graph data.

FIG. 19C illustrates an example of the semantic big data analysis.

The server apparatus 100 analyzes big data. The source of the big data may include the enterprise data in addition to the IoT sensor data, device website data, SNS data, and web search data. For example, the server apparatus 100 may collect and analyze the information that a product sold the most in New York is an air conditioner A.

According to the analysis result, an association rule and a domain may be reasoned. For example, the domain, such as, location, device, population, event, and economy, may be reasoned.

The server apparatus 100 may perform the semantic annotation and generate the result obtained by the big data analysis as a multidimensional view by utilizing the related information. For example, the server apparatus 100 may generate a multidimensional view of North America or New Jersey with respect to New York.

The reasoning of the association rule and domain and the semantic annotation may be performed through the auxiliary operation of the semantic reinforcement engine.

Further, the server apparatus 100 may perform the dynamic multidimensional analysis and analyze relevancy between a plurality of domains and the multidimensional view of the respective domains. For example, the server apparatus 100 may derive the relevancy between the functions of the device and regions, ages, or genders or the relevancy between the functions of the device and considerations in design and development, malfunction, regions, or weather.

The server apparatus 100 may process the queries in real time by using the relation generated by the semantic reinforcement engine through Federated semantic search without physical movement or integration of the data.

The above-described the semantic reinforcement engine may be executed in real time or periodically. The respective data may be linked with a different type of data, and the detailed information on the data may be accessed through the linking operation.

Figure 20:
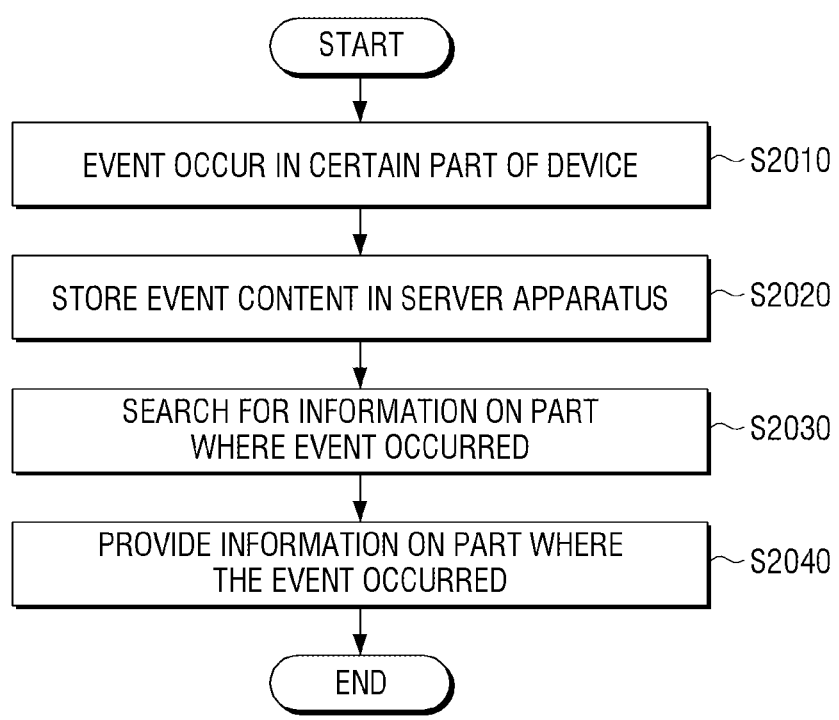
FIG. 20 is a flowchart provided to describe an operation of a server apparatus according to an extended embodiment disclosed herein.

FIG. 20 is a flowchart provided to describe an operation of a server apparatus according to an extended embodiment disclosed herein.

An event occurs in a certain part of a device (S2010). In this case, the event occurred in the device may vary depending upon a type of the device. By way of example, a smart phone may have the events of unlocking a lock screen or sending a text message, and a washing machine may have the events of starting washing, setting a washing cycle, or opening/closing a door of the washing machine.

Further, the server apparatus may store event details (S2020). The server apparatus may receive the event details from the respective devices and store the received event details. The server apparatus may be directly connected to the respective devices through Bluetooth or may be indirectly connected to the respective devices through an Access Point (AP).

The server apparatus may sort and store the event details for each category of the respective devices. Further, the server apparatus may sort and store the event details according to an occurrence time of the events.

The server apparatus may search for the information on a part of the device where the event occurred (S2030). The server apparatus may determine where the part is and search for the function related to the part of the device where the event occurred. The server apparatus may additionally search for another device which provides the searched function or may additionally search for another device compatible with the searched function.

The server apparatus may provide the information on the part of the device where the event occurred (S2040). The server apparatus may provide the information by using the display of the server apparatus or may transmit the searched information to an external display apparatus so as to display the information. Further, the server apparatus may transmit the searched information the respective user terminal apparatuses.

In the above embodiment, the event occurs in response to a user manipulation, but not limited thereto. For example, it is assumed that the user executes a certain application of a smart phone and walk around a store. In response to the user's smart phone being located within a predetermined distance from a particular device, the particular device may transmit the identification information on the device to the server apparatus. In this case, the server apparatus may transmit the specification information on the device to the LFD device to provide the specification information to the user.

In response to the user executing a certain application of the smart phone, the user account may be accessed, and the information on the device that the user manipulated may be stored. For example, in response to the user's smart phone being located within a predetermined distance from the particular device, the user's smart phone may transmit the identification information on the particular device to an external server apparatus. In this case, the external server apparatus may store the information on the user account and the information on the particular device having the identification information stored from the user account.

The external server apparatus may transmit the detailed information on the particular device, such as, the specification information, to the smart phone. The user may check the information on the adjacent particular device by using the smart phone.

The user may access the external server apparatus and check the information on the particular device manipulated by the user after coming out of the store. Particularly, the user may check the information on the particular device by using another device which is not the smart phone, for example, a notebook computer. In this case, the user should access an user account of the external server apparatus through the another device.

According to the above-described various embodiments, the recommended device information on the device compatible with the user device may be generated, and the generated information may be provided to the user.

In the above embodiments, it was described that the server apparatus and the user terminal apparatus are separate apparatuses, but the server apparatus and the user terminal apparatus may be realized as one apparatus. For example, the user terminal apparatus may receive the uttered voice and display the recommended device information corresponding to the received uttered voice. Or, the user terminal apparatus may calculate the size of the specific space from the photographed image and display the recommended device information corresponding to the calculated size of the specific space.

In addition, the methods according to above-described various embodiments may be realized as a program and stored in various recording mediums. Accordingly, the methods in the above embodiments may be realized in various kinds of electronic apparatuses which execute the recording mediums.

To be specific, there may be provided a non-transitory computer readable medium including a program for sequentially executing the methods.

The non-transitory computer readable medium refers to a machine-readable medium that stores data semi-permanently unlike a register, a cache, or a memory that stores data for a short time. Particularly, the above-described various applications and programs may be stored in and provided through the non-transitory computer readable medium, such as, a Compact Disc (CD), a Digital Versatile Disc (DVD), a hard disc, a Blu-ray disc, a Universal Serial Bus (USB), a memory card, a Read-Only Memory (ROM), or the like.

As above, a few embodiments have been shown and described. The foregoing embodiments and advantages are merely exemplary and are not to be construed as limiting the present inventive concept. The present teaching can be readily applied to other types of devices. Also, the description of the embodiments is intended to be illustrative, and not to limit the scope of the claims, and many alternatives, modifications, and variations will be apparent to a person having ordinary skill in the art.

What is claimed is:

1. A server apparatus comprising:
a communication unit configured to communicate with a user terminal apparatus;
a storage configured to store hardware-wise compatible information between devices and functions provided by each of the devices; and
a processor configured to:
in response to a user uttered voice signal inputted at the user terminal apparatus being received from the user terminal apparatus, extract a function from at least one text included in the user uttered voice signal, wherein the function is included in the functions stored in the storage,
receive an image photographed by a camera included in the user terminal apparatus from the user terminal apparatus,
detect an identification image included in the received image,
determine a shape of the identification image,
determine an angle of the identification image with respect to the camera based on the determined shape,
in response to an area to be measured being designated by a user, calculate a size of the area based on the angle and pre-stored information about a size of the identification image,
obtain recommended device information about a device which is compatible with the function, and which is hardware-wise compatible with the user terminal apparatus, based on information stored in the storage and the calculated size of the area, and
transmit the obtained recommended device information to the user terminal apparatus,
wherein the processor is further configured to:
in response to the uttered voice signal including names of a plurality of different types of devices, detect specification information on an interaction function between the plurality of different types of devices from the storage, decide information on a device which provides the interaction function as the recommended device information, and in response to the specification information not being extracted, transmit a signal for requesting for input of an additional uttered voice to the user terminal apparatus, and
transmit information on the number of functions supported by the device which provides the interaction function to the user terminal apparatus.

2. The server apparatus as claimed in claim 1, wherein the processor obtains device information on a device which is hardware-wise compatible with a user device registered at a user account of the user terminal apparatus as the recommended device information based on information on the registered user device.

3. A method for controlling a server apparatus, the method comprising:
in response to a user uttered voice signal inputted at a user terminal apparatus being received from the user terminal apparatus, extracting a function from at least one text included in the user uttered voice signal,
receiving an image photographed by a camera included in the user terminal apparatus from the user terminal apparatus;
detecting an identification image included in the received image;
determining a shape of the identification image;
determining an angle of the identification image with respect to the camera based on the determined shape;
in response to an area to be measured being designated by a user, calculating a size of the area based on the angle and pre-stored information about a size of the identification image;
obtaining recommended device information about a device which is compatible with the function, and which is hardware-wise compatible with the user terminal apparatus apparatus, based on hardware-wise compatible information between devices, functions provided by each of the devices and the calculated size of the area, wherein the function is included in the functions; and
transmitting the obtained recommended device information to the user terminal apparatus,
wherein the deciding comprises:
in response to the uttered voice signal including names of a plurality of different types of devices, detecting specification information on an interaction function between the plurality of different types of devices from a storage, deciding information on a device which provides the interaction function as the recommended device information, and in response to the specification information not being extracted, transmitting a signal for requesting for input of an additional uttered voice to the user terminal apparatus, and
transmitting information on a number of functions supported by the device which provides the interaction function to the user terminal apparatus.

4. The method as claimed in claim 3, wherein the obtaining comprises obtaining device information on the device hardware-wise compatible with a user device registered at a user account of the user terminal apparatus as the recommended device information based on information of the registered user device.

5. The server apparatus of claim 1, wherein the identification image comprises an image of a square having a known size.

* * * * *